(12) United States Patent  (10) Patent No.: US 7,391,339 B2
Howard et al.  (45) Date of Patent: Jun. 24, 2008

(54) PARKING MANAGEMENT SYSTEMS

(75) Inventors: Charles K. Howard, Somerville, MA (US); Kenroy Cayetano, Boston, MA (US); Olufemi Omojola, Boston, MA (US)

(73) Assignee: Vehiclesense, Inc., Cambridge, MA (US)

( * ) Notice: Subject to any disclaimer, the term of this patent is extended or adjusted under 35 U.S.C. 154(b) by 0 days.

(21) Appl. No.: 11/114,615

(22) Filed: Apr. 25, 2005

(65) Prior Publication Data

US 2005/0190076 A1 Sep. 1, 2005

Related U.S. Application Data

(63) Continuation of application No. 10/072,808, filed on Feb. 7, 2002, now Pat. No. 6,885,311.

(60) Provisional application No. 60/267,059, filed on Feb. 7, 2001.

(51) Int. Cl.
*B60Q 1/48* (2006.01)
(52) U.S. Cl. .................... 340/932.2; 340/933
(58) Field of Classification Search ............. 340/932.2, 340/933, 693.9; 701/1
See application file for complete search history.

(56) References Cited

U.S. PATENT DOCUMENTS

| | | | |
|---|---|---|---|
| 5,263,118 A | 11/1993 | Cornelison | |
| 5,266,947 A * | 11/1993 | Fujiwara et al. | 340/932.2 |
| 5,339,000 A | 8/1994 | Bashan et al. | |
| 5,414,624 A | 5/1995 | Anthonyson | |
| 5,432,508 A | 7/1995 | Jackson | |
| 5,642,119 A | 6/1997 | Jacobs | |
| 5,648,906 A | 7/1997 | Amirpanahi | |
| 5,710,743 A | 1/1998 | Dee et al. | |
| 5,740,050 A | 4/1998 | Ward, II | |
| 5,751,973 A | 5/1998 | Hassett | |
| 5,877,705 A | 3/1999 | Sampey | |
| 5,910,782 A | 6/1999 | Schmitt et al. | |

(Continued)

FOREIGN PATENT DOCUMENTS

JP  62-182890  8/1987

(Continued)

OTHER PUBLICATIONS

AeroAstro. MSCI Partners with AeroAstro to Fund Noise Monitoring Demo at Gulfport-Biloxi Airport. About AeroAstro, http://www.spacecommerce.com/msci_companies/aeroastro_pres.html (Jun. 4, 2001).

(Continued)

*Primary Examiner*—John Tweel
(74) *Attorney, Agent, or Firm*—Ropes & Gray LLP

(57) ABSTRACT

The systems described herein include one or more wireless vehicle detectors, along with a distributed parking payment system such as parking meters or a paystation. Information from the payment system and the vehicle detectors may be combined to determine when a parking violation occurs, or is about to occur. This information may then be transmitted through a communication system to a parking enforcement officer, along with information about the geographic location of the violation. The information may also, or instead be transmitted to a parking payer to notify the payer of an impending infraction so that the payer may purchase additional parking time before the violation.

15 Claims, 18 Drawing Sheets

U.S. PATENT DOCUMENTS

| | | | |
|---|---|---|---|
| 5,940,481 | A | 8/1999 | Zeitman et al. |
| 6,037,880 | A | 3/2000 | Manion |
| 6,107,942 | A | 8/2000 | Yoo et al. |
| 6,147,624 | A | 11/2000 | Clapper |
| 6,195,015 | B1 * | 2/2001 | Jacobs et al. .............. 340/693.9 |
| 6,229,455 | B1 | 5/2001 | Yost et al. |
| 6,243,029 | B1 | 6/2001 | Tomer et al. |
| 6,278,272 | B1 | 8/2001 | Scarzello et al. |
| 6,340,935 | B1 | 1/2002 | Hall |
| 6,344,806 | B1 * | 2/2002 | Katz ........................ 340/932.2 |
| RE37,822 | E * | 8/2002 | Anthonyson .................... 701/1 |
| 6,459,386 | B1 * | 10/2002 | Jones ....................... 340/932.2 |
| 6,501,391 | B1 * | 12/2002 | Racunas, Jr. .............. 340/932.2 |
| 6,505,774 | B1 * | 1/2003 | Fulcher et al. .............. 235/381 |
| 6,559,776 | B2 * | 5/2003 | Katz ........................ 340/932.2 |
| 6,885,311 | B2 * | 4/2005 | Howard et al. ........... 340/932.2 |

FOREIGN PATENT DOCUMENTS

| | | |
|---|---|---|
| JP | 06-97863 | 8/1994 |
| JP | 7168999 | 7/1995 |
| JP | 9305814 | 11/1997 |
| WO | WO-99/30290 | 6/1999 |
| WO | WO-00/23949 | 4/2000 |
| WO | WO-00/46068 | 8/2000 |

OTHER PUBLICATIONS

Algorithms. http://robotics.eecs.berkeley.edu/~pister//29Palms0103/JasonUpdate/29palms.htm (Nov. 8, 2001).

Caruso, Michael J. & Wirhanawasam, Lucky S. Vehicle Detection and Compass Applications using AMR Magnetic Sensors. www.ssec.honeywell.com, Nov. 19, 2007.

Crossbow Technology, Inc. Crossbow Technology Now Manufacturing New wireless 'MICA' Sensors Targeted at Surveillance, Security and Force Protection Applications. Yahoo! Finance, http://biz.yahoo.com/bw/011024/240541_1.html (Oct. 24, 2001).

Fiber & Electro-Optics Research Center. Analysis of Magnetic Signatures Using the Wavelet-Based Signal Processing Techniques. FEORC Press Release, http://www.ee.vt.educ/~feorc/fiberoptics.htm (Nov. 8, 2001).

IMS. FGS1/COB07 Fluxgate Magnetic Field Sensor System: Vehicle Detection and Recognition Using Magnetic Field Sensors http://www.ims.fhg.de/datenglaetter/magnetfeldsensorik/vehicle/vehicle-e.html (Nov. 8, 2001).

InnovaPark, L.L.C. InnovaPark introduces the most innovative parking space management system detection technology since the introduction of the electronic parking meter. InnovaPark, L.L.C. 110 Roseville Road, Westport, CT 06880, www.Smart-Meters.com, Nov. 19, 2007.

Midian Eelctronics. SPVD-1, Wireless Vehicle Detector. Products, http://www.midelec.com/html (Nov. 8, 2001).

Nu-Metrics. Groundhog®, Permanent Traffic Counter. www.nu-metrics.com, NuMetrics®, Aquixote Company, Box 518 University Drive, Uniontown, PA 15401, Nov. 19, 2007.

Peek Traffic. Parking guidance system and route information. Which solutions can Peek tRaffic offer you?, http://www.peektraffic.nl.opossingen/en/parkeren.htm (Dec. 6, 2001).

Phadnis, Chitra. Treat Yourself to Some 'Smart' Parking. Yahoo! India Finance, http://in.biz.yahoo.com/011113/17/18rmq.html (Nov. 14, 2001).

Ripka, Pavel. Magnetic Sensors for Traffic Control. Dept. of Measurement, Faculty of Electrical Engineering CTU/ Technicka 2, 166 27 Praha 6, Czech Republic, ripka@feld.cvut.cz, Nov. 19, 2007.

Schick electronic sa. Signal-Park, The first system which: detects, counrs and indicates the vacant places. Signal-park@schick-sa.com; Schick electronic sa.av., Nov. 19, 2007.

Sepoong Ind. Electric Compass Module Vector 2x (2Axis). http://www.sepoong.co.kr/components/pn/oem/vector2x.htm (Nov. 8, 2001).

Siemens. Siespace—Car Park Control and Information Systems. Siemens Traffic Controls Limited, http://www.siemens.co.uk/traffic/siespace.htm (Dec. 7, 2001).

Siemens AG—Industrial Projects and Technical Services (ATD). Making parking a pleasure in Budapest—Siemens supplies modern parking voucher machines for Hungary's capital. Siemens Industrial Projects and Technical Services, http://www.atd.siemens.de/news/technical/09002018e.html (Nov. 9, 2000).

TCS International. Dambach-Parking Guidance, Electronic Signs, Level and Space Counting Systems, TCS International Products, http://www/tcsintl.com/parkguide.html (Dec. 6, 2001).

Tenet ITMapping. Smart parking systems benefit more than just the car park. Mapping Software Solutions, http://www.tenet.co.uk/solution/telematics/parking.htm (Dec. 6, 2001).

Twisted Air Technologies. Meter Enhancement Modules: Wireless Communications and Vehicle Detection. http://www.twistedair.com/msys02.htm (Nov. 9, 2001).

Video Surveillance and monitoring. © 2000 Carnegie Mellon University, Robotics Institute, http://www-2.cs.cmu.edu/~vsam/vsamhome.html (Nov. 10, 2001).

Ward, Tom. Otay Mesa Road Smart Loop Technology Demonstration Project. Ornicon Corporation, tward@ornicon.com (Sep. 5, 2000).

* cited by examiner

PARKING MANAGEMENT SYSTEMS

RELATED APPLICATION

This application is a continuation of U.S. application Ser. No. 10/072,808, filed Feb. 7, 2002 now U.S. Pat. No. 6,885,311 and claims the benefit of and incorporates by reference, the entire disclosure of U.S. Provisional Patent Application No. 60/267,059, filed Feb. 7, 2001.

FIELD OF THE INVENTION

The invention relates to methods and systems for managing parking facilities, and more particularly to methods and systems that combine information from a payment system with vehicle information to determine if and/or when a parking infraction accurs.

BACKGROUND OF THE INVENTION

Rules and regulations are commonplace for vehicular parking. Such rules may include absolute prohibitions, such as areas in which no parking is permitted, or the rules may include conditional prohibitions, such as permit-only parking. Metered parking is also typical on public roadways. In addition to various types of parking restrictions, the rules may be enforced by either private or public agencies.

Monitoring parking that is restricted in any of the above manners is costly and time consuming. Typically, a person must visually inspect all of the restricted spaces periodically, regardless of whether cars are actually there. This task becomes more difficult when the spaces are distributed over a large area, such as a city block or a large, multi-level parking garage. While parking monitoring systems have been described, they are typically limited to the detection of the presence or absence of a vehicle in a particular location. Such systems are employed, for example, in garages to provide occupancy statistics, and to direct vehicles to open spaces. As a significant disadvantage, these systems do not apply parking restriction rules to determine whether a particular vehicle is parked in a spot where it should not be. As a further disadvantage, so-called 'smart' parking systems of the prior art employ transducers hardwired into a parking detection network. These systems cannot be retro-fitted to existing parking structures or infrastructures.

There remains a need for an automated parking enforcement system that can be adapted to existing parking facilities.

SUMMARY OF THE INVENTION

The systems and methods described herein include one or more wireless vehicle detectors, along with a distributed parking payment system such as parking meters and/or a paystation. Information from the payment system and the vehicle detectors may be combined to determine when a parking violation occurs, or is about to occur. This information may then be transmitted through a communication system to a parking enforcement officer, along with information about the geographic location of the violation. The information may also, or instead be transmitted to a parking payer to notify the payer of an impending infraction so that the payer may purchase additional parking time before the violation.

According to one aspect of the invention, the system includes a sensor for detecting the presence of a vehicle within a parking space, and a parking meter associated with the parking space. The parking meter is configured to receive a payment and includes a timer that allots time according to the received payment. A host is provided that is capable of communicating with the sensor and the parking meter, wherein the communication between the sensor and the host is wireless. The host is configured to monitor the sensor and the parking meter and to determine if and/or when the parking space contains an unauthorized vehicle. The host is further configured to notify an enforcement official of the location of the unauthorized vehicle.

According to another aspect of the invention, instead of determining the presence of an unauthorized vehicle and notifying an enforcement official, the host notifies a payer when a payment for the vehicle in the parking space is about to expire.

According to yet another aspect of the invention, the system includes a sensor for detecting the presence of a vehicle within a parking zone, which can also be a no parking zone or a restricted parking zone. The host is configured to monitor the sensor and the parking meter and is capable of notifying an enforcement official of the location of the unauthorized vehicle.

According to another aspect of the invention, a method includes receiving a first signal from a parking space, the first signal including data concerning the presence of a vehicle in the parking space; and receiving a second signal from a parking meter associated with the parking space, the second signal include data concerning payments received by the parking meter for use of the parking space. The method further includes determining when a parking violation has occurred, i.e., when data in the first signal indicate that a vehicle is present in the parking space and the data in the second signal indicate that there is no current payment for the parking space. In response to the parking violation, a message is generated to notify an enforcement official of the parking violation and the location of the parking space where the parking violation has occurred.

Embodiments of the invention may include one ore more of the following features. An unauthorized vehicle can be a vehicle for which no payment has been received or a vehicle for which a payment has expired. The system can include a base station for maintaining communications between the sensor and the host. The host can determine when a payment for a parking space is about to expire and generate a notification to a payer who has previously paid for use of the parking space. The payer can be notified through an electronic mail message, a telephone message and/or an electronic page, for example, a Web page.

The host can notify the enforcement official of the violation by transmitting a message to a wireless device used by the enforcement official who can also be an appointed private official, such as a towing company. The parking meter can employ a wireless payment process and can also communicate with the host through a wireless interface.

The parking meter can be a paystation that manages payments for a plurality of parking spaces, and the host can be physically located within the paystation. Alternatively or in addition, the paystation can contain both sensors and parking meters.

When monitoring parking in a parking area such as a parking garage, a parking lot and/or a public street, the system can include more than one sensor and more than one parking meter.

BRIEF DESCRIPTION OF THE DRAWINGS

The foregoing and other objects and advantages of the invention will be appreciated more fully from the following further description thereof, with reference to the accompanying drawings, wherein.

DETAILED DESCRIPTION OF CERTAIN EMBODIMENTS OF THE INVENTION

To provide an overall understanding of the invention, certain illustrative embodiments will now be described, including a wireless parking system. However, it will be understood that the methods and systems described herein can be suitably adapted to other applications and environments where a number of physical spaces are managed for use by paying customers, such as tables at a restaurant or dockage at a marina. All such variations are intended to fall within the scope of the invention described below.

Figure 1:
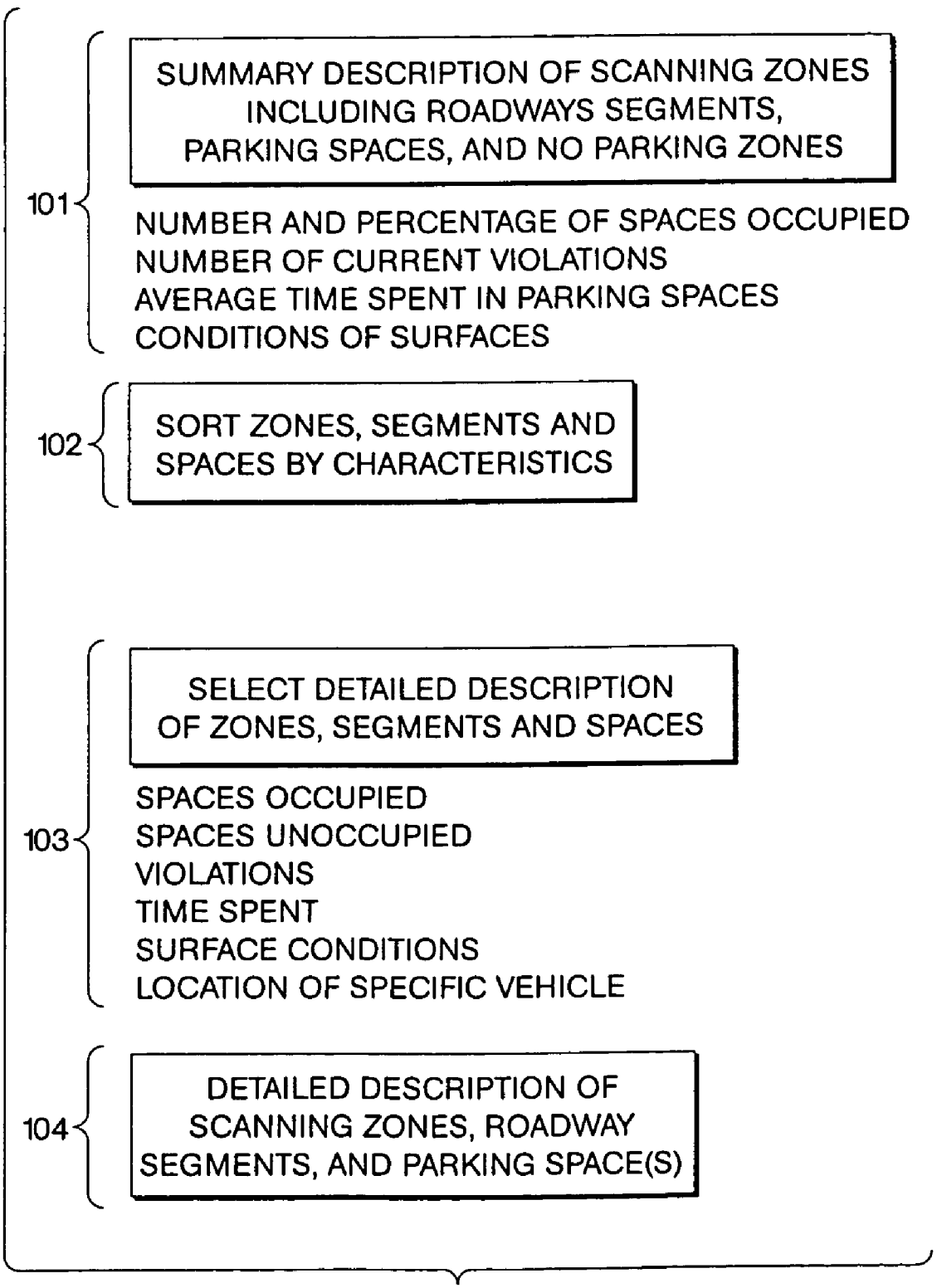
FIG. 1 shows the surface monitoring, roadway segment monitoring, parking monitoring and parking enforcement in one embodiment of a wireless sensor network of the present invention.

FIG. 1 shows surface monitoring, roadway segment monitoring, parking monitoring and parking enforcement in one embodiment of a wireless sensor network of the present invention. FIG. 1 illustrates the components of a Web page describing the current status of roadway segments, parking spaces, no parking zones, and other scanning areas within the coverage area. This example Web page may be formatted using any conventional Web technology, and may be communicated from a server system to a client system in response to a request for detailed information about a coverage area. The Web page may contain a summary description section 101, a sorting space events by characteristics section 102, a selection of spaces section 103, and a detailed description of roadway segments, scanning zones, and parking space(s) section 104. One skilled in the art would appreciate that these various sections can be omitted or rearranged or adapted in various ways. Moreover, the difference between parking spaces, areas, zones and/or no parking zones is mainly their administration, so that the vehicle sensing method and system described herein can apply to the monitoring of parking as well as no parking space/areas/zones. The, summary description and the detailed description sections provide information that identifies and describes the status of various roadways segments, parking spaces, no paring zones, and other scanning areas. The detailed description of spaces section provides the capability to examine various scanning areas based upon pre-selected conditions.

Figure 2:
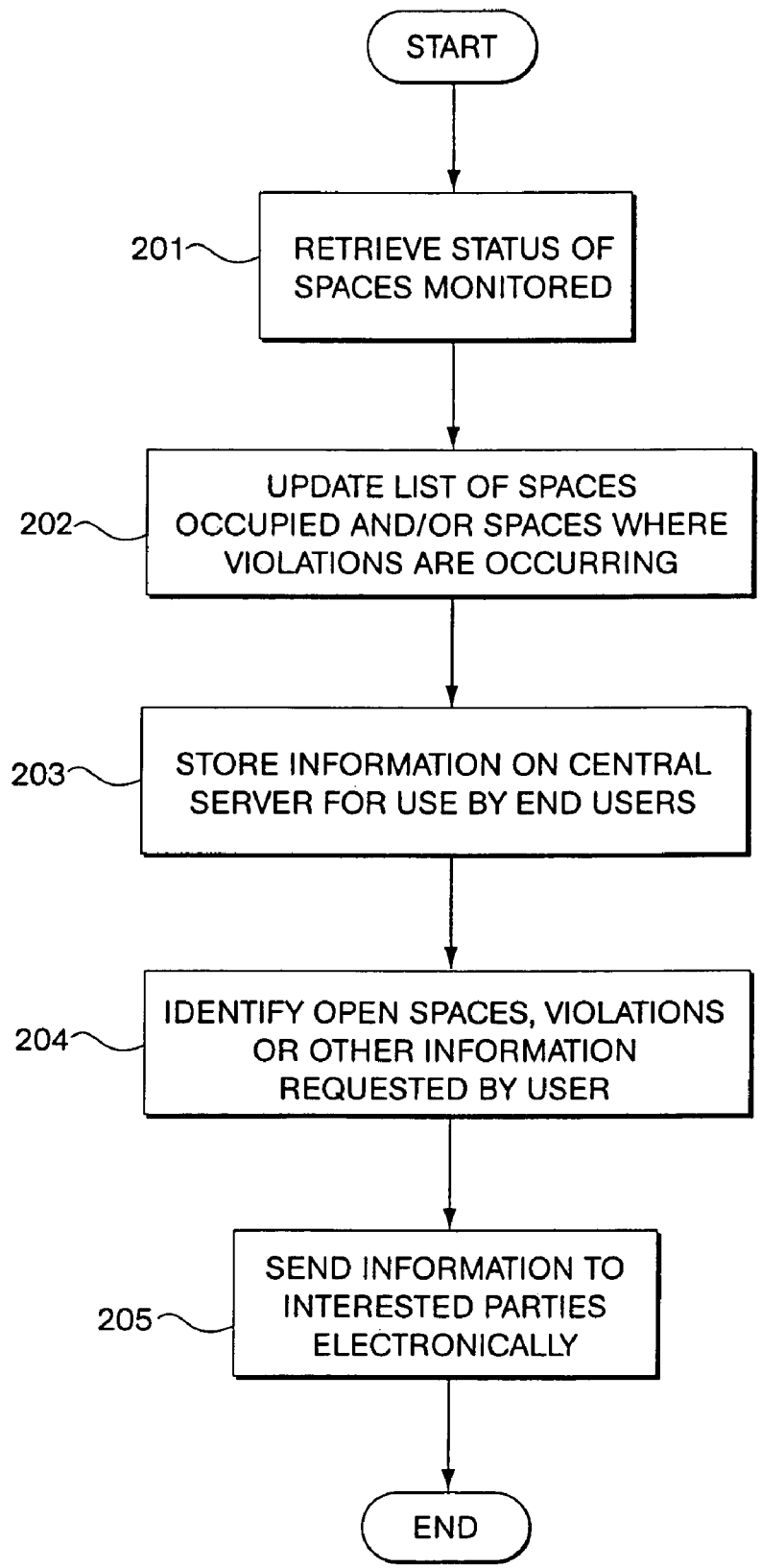
FIG. 2 is a flow diagram of a process for remote monitoring, enforcement and reservation of parking spaces.

FIG. 2 is a flow diagram of a process for remote monitoring, enforcement and reservation of parking spaces. This system uses a wireless sensor network for a parking monitoring, enforcement, and reservation system. To enable the monitoring, enforcement and/or reservation system, the server system needs to have information on the service area. This information includes the status of the parking spaces (including but not limited to percentage occupied, time of occupancy and historical data), the rules and regulations of the parking spaces, and the demand for parking spaces.

In step 201 the wireless sensors monitor the statues of parking spaces, zones, and no parking areas. Wireless sensors scan areas for the presence of vehicles. The sensor network determines if there is a vehicle present, and the network stores and transmits the properties and ID (if available) of the vehicle and/or the properties of the space.

In step 202 the applicable sensor in conjunction with the network determines if the vehicle is in violation of any laws. This may include, for example, violation of a no parking zone such as a fire lane, violation of a limited no parking zone (e.g., no parking after 9:00 a.m. and before 5:00 p.m.), violation of a limited duration parking zone (fifteen minute parking only), or expiration of the allotted time for a metered parking space. If the vehicle is in violation of applicable rules (such as for a private garage) or laws (such as for municipal parking), then the process continues to step 203.

In step 203 the space is put on the violation queue then continues to step 204. In step 204 the appropriate authorities are notified, either private parking enforcement for a private garage, or public enforcement officials such as police officers for government managed public parking. The sensor and network monitor the space to determine if the authorities have arrived or if the vehicle has left prior to the authorities arriving. If either of these events happens then the space may be removed from the violation queue.

In step 205, information may be sent to interested parties. This may be any party that can receive communication from the server system operating the process described herein. For example, one interested party may be a police officer assigned to monitor parking spaces. The police officer may receive electronic mail or other electronic notification through a wireless, handheld device. The notification may include the type of violation and the location of the violation. In one embodiment, the system may process a number of violations to determine a shortest path for the officer to traverse the violations, so that the officer may more quickly distribute tickets or take other enforcement action. The notification may also, or instead, include notification to a central police dispatcher who may then communicate the violation to an officer through any communication channel, including cell phone, radio, or the like. Whether the parking system is privately or governmentally operated, the notification may include notification to a tow truck service where, for example, the violation occurs in a two zone. In one embodiment, the system may monitor metered parking spaces, and may generate a notification to the payer shortly before the allotted time for the space is to expire. In such an embodiment, the payer must provide contact information to the system, either at the parking space or through a central database, so that the payer may be notified through an appropriate channel, such as electronic mail, cellular phone, pager, or the like.

The process shown in FIG. 2, and each of the figures that follow, may be realized in hardware, software, or some combination of these. The process may be realized in one or more microprocessors, microcontrollers, embedded microcontrollers, programmable digital signal processors or other programmable device, along with internal and/or external memory such as read-only memory, programmable read-only memory, electronically erasable programmable read-only memory, random access memory, dynamic random access memory, double data rate random access memory, Rambus direct random access memory, flash memory, or any other volatile or non-volatile memory for storing program instructions, program data, and program output or other intermediate or final results. The process may also, or instead, include an application specific integrated circuit, a programmable gate array, programmable array logic, or any other device that may be configured to process electronic signals.

Any combination of the above circuits and components, whether packaged discretely, as a chip, as a chipset, or as a die, may be suitably adapted to use with the systems described herein. It will further be appreciated that the process may be realized as computer executable code created using a structured programming language such as C, an object-oriented programming language such as C++ or Java, or any other high-level or low-level programming language that may be compiled or interpreted to run on one of the above devices, as well as heterogeneous combinations of processors, processor architectures, or combinations of different hardware and software. The process may be deployed using software technologies or development environments including a mix of software languages, such as Microsoft IIS, Active Server Pages, Java, C++, Oracle databases, SQL, and so forth. All such realizations of the processes described above and below are intended to fall within the scope of the system described herein.

Figure 3:
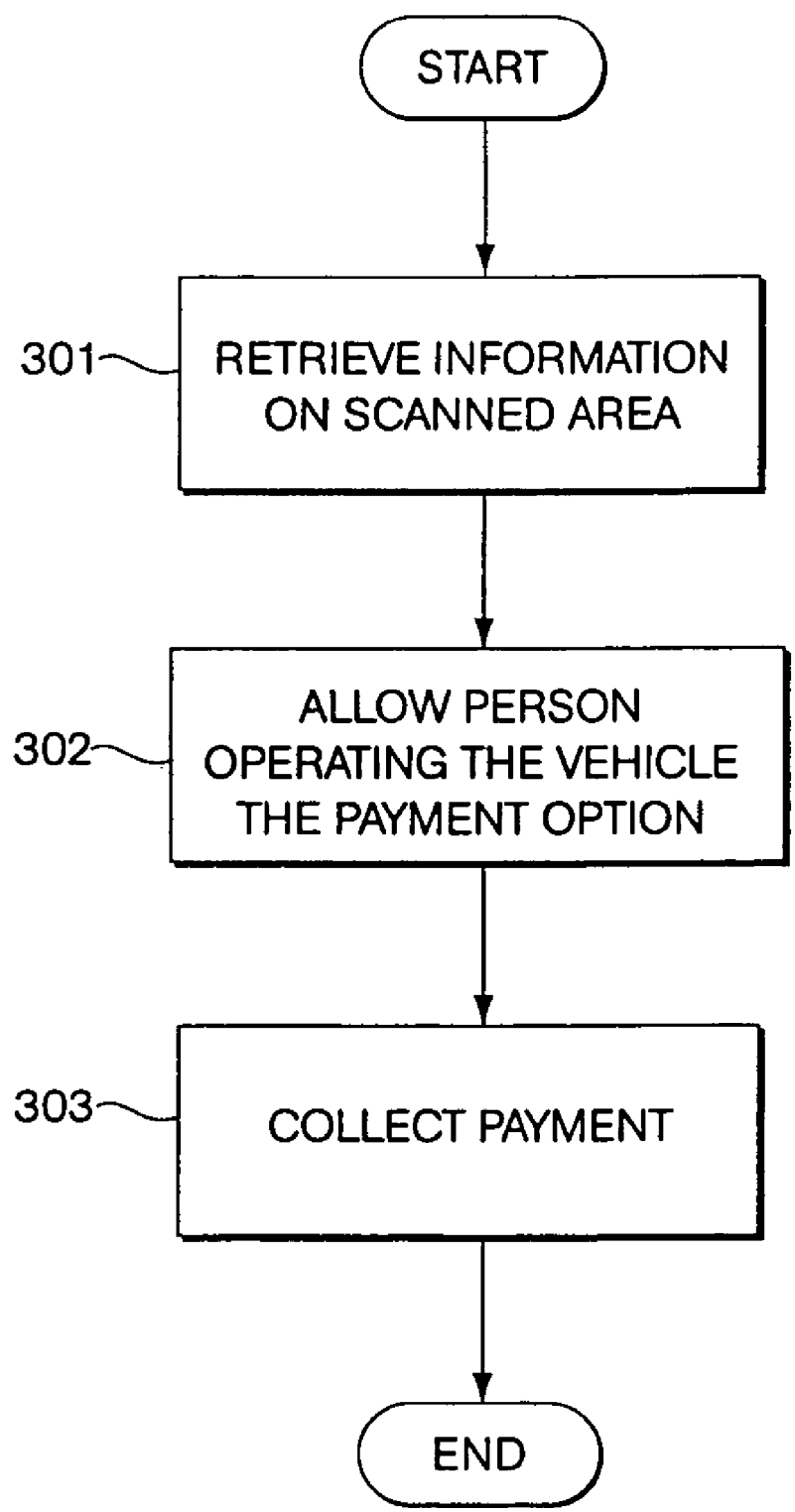
FIG. 3 is a flow diagram of a process for automatic vehicle payment using a wireless sensor network.

FIG. 3 is a flow diagram of a process for automatic vehicle payment using a wireless sensor network. In this wireless payment process, the server system may use information on the presence of a vehicle and whether that vehicle has the necessary properties for the payment system. This information may include the status of the scanned area if there is a vehicle present, and the properties of the vehicle in the scanning zone. In step 301, a wireless sensor scans the area and determines if there is a vehicle present. If a vehicle is present, then the vehicle is scanned for the presence of the ID properties that would allow it use an automated payment system. This may include, for example, image processing such as reading a license plate of the vehicle, or this may include a transponder in the vehicle that provides identification information, or this may include a cellular phone or other wireless message device held by the vehicle operator. In step 302, these criteria are met and the system asks if the person operating the vehicle wants to use this payment method. In step 303 the payment is collected from the payment system set up by the users.

Figure 4:
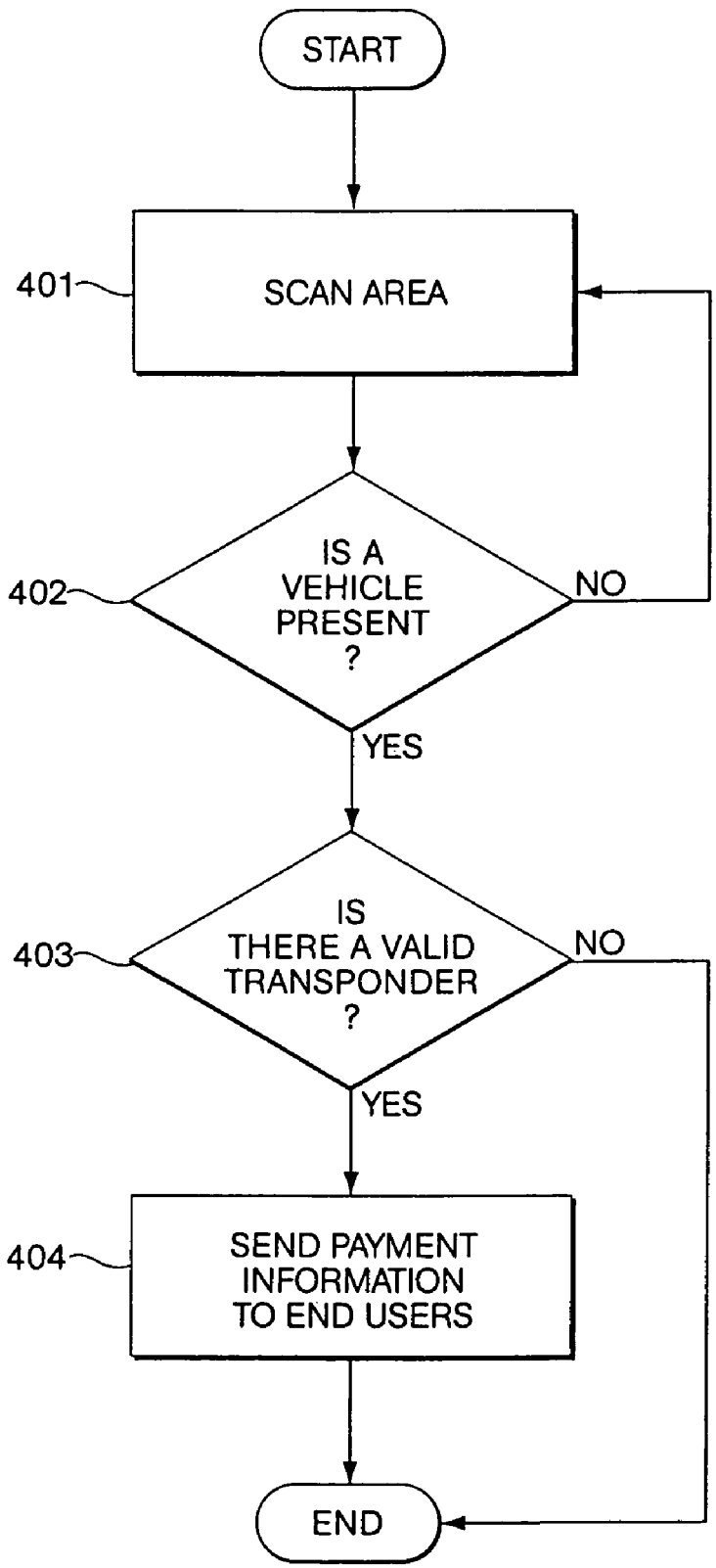
FIG. 4 is a flow diagram of a process for automatic vehicle payment using a wireless sensor network.

FIG. 4 is a flow diagram of a process for automatic vehicle payment using a wireless sensor network. When a car enters the scanning area the sensor notifies the server system if the car participates in the automatic payment system. In step 401 the wireless sensor checks the scanning area for a vehicle, then continues to step 402. In step 402, the system processes the data from the wireless sensor to determine if a vehicle is present. If a vehicle is present the system continues to step 403, otherwise returning step 401. In step 403 the system checks the vehicle to see if there is a valid transponder on it and whether the transponder participates in the automatic vehicle payment system. If it does then the system continues to step 404 where payment information is sent to the end users for their approval or denial of payment.

Figure 5:
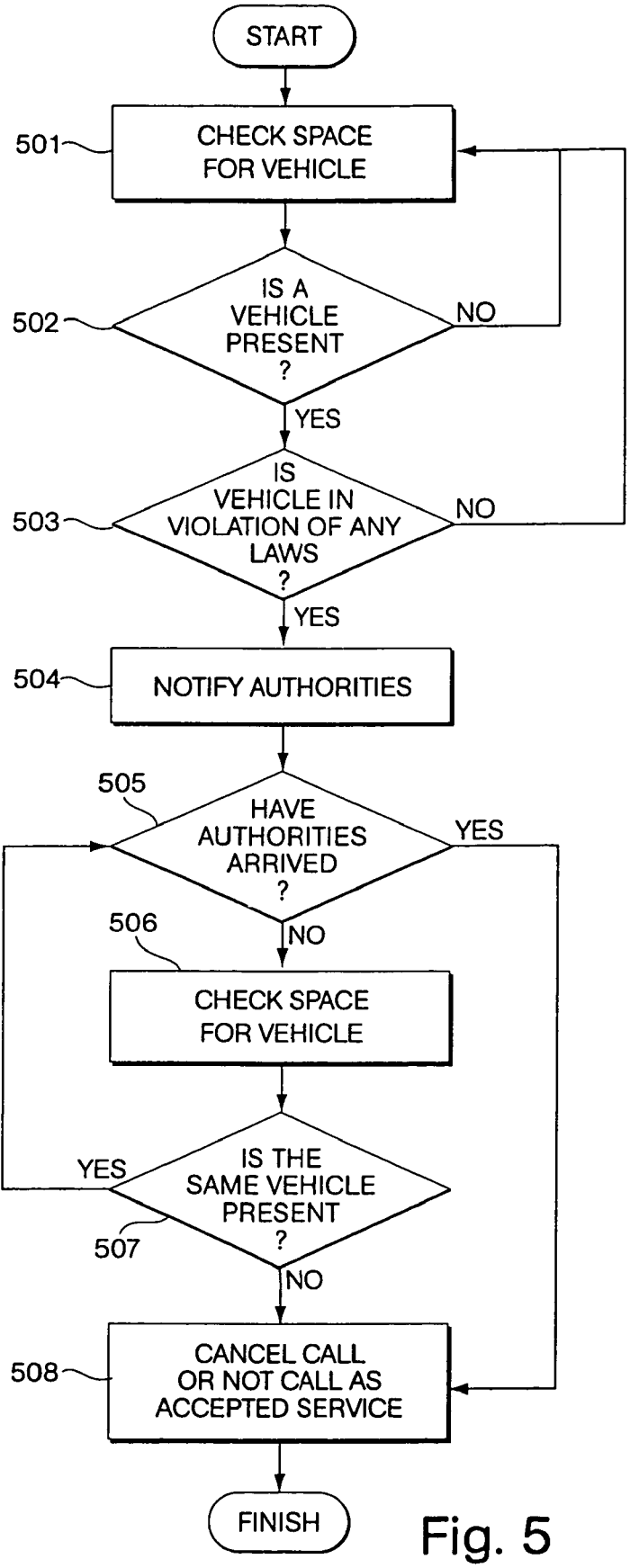
FIG. 5 is a flow diagram of a process for determining if a vehicle is in violation of any rules using a wireless sensor network.

FIG. 5 is a flow diagram of a process for determining if a vehicle is in violation of any laws using a wireless sensor network. When a vehicle is present in a sensor area for a designated amount of time, the sensor notifies the server system. The server combines information gathered from the sensor and the parking information associated with the sensor to determine whether the vehicle is in violation of any laws. This may include, for example, rules and restrictions associated with the monitored parking space, as well as payment information for the parking space, such as cash provided to a parking meter associated with the space. It will be appreciated that a 'parking meter' as used herein, is intended to include any single-space parking meter such as conventionally seen on public roads, as well as multi-space parking space timing devices, such as paystations, and any other pay-for-time device used in conjunction with vehicle parking spaces, unless a different meaning is specifically indicated. In a paystation topology, a plurality of 'parking meters' may operate within a single unit, located at some convenient physical point in a parking lot, each parking meter keeping track of time alloted to some space, while a distributed wireless network of sensors monitors for the corresponding presence of vehicles. In some embodiments, a parking meter may be integrated with a sensor in a single housing, or the parking meter and the sensor may be separate, stand-alone devices.

In step 501, the sensor checks the space for the presence of a vehicle then continues to step 502. In step 502, if there is a vehicle in the scanning area the system continues at step 503, otherwise returning to step 501. In step 503 the system determines if the vehicle present is in violation of any laws. If the vehicle is in violation of any laws the system continues to step 504, otherwise returning to step 501. In step 504 the system notifies the proper authorities that there is a vehicle in the scanning area that is in violation of a law (it may report the violation to the person in question as well or others). More specifically, the system may report the violation(s), with the status and location of the violator being placed on a queue of violations. The process may then continue to step 505, where the system checks to see if the authorities have arrived, or otherwise responded to the violation. If the authorities have responded, the system may log an arrival time, location, and ID number. The process may then continue to step 508. If the authorities have not arrived, the process may return to step 506, where the space is rescanned and the process proceeds to step 507. In step 507 the system processes the data from step 506 to determine if the violator is still present. If the violator is present the system returns to step 505, otherwise continuing to step 508.

Figure 6:
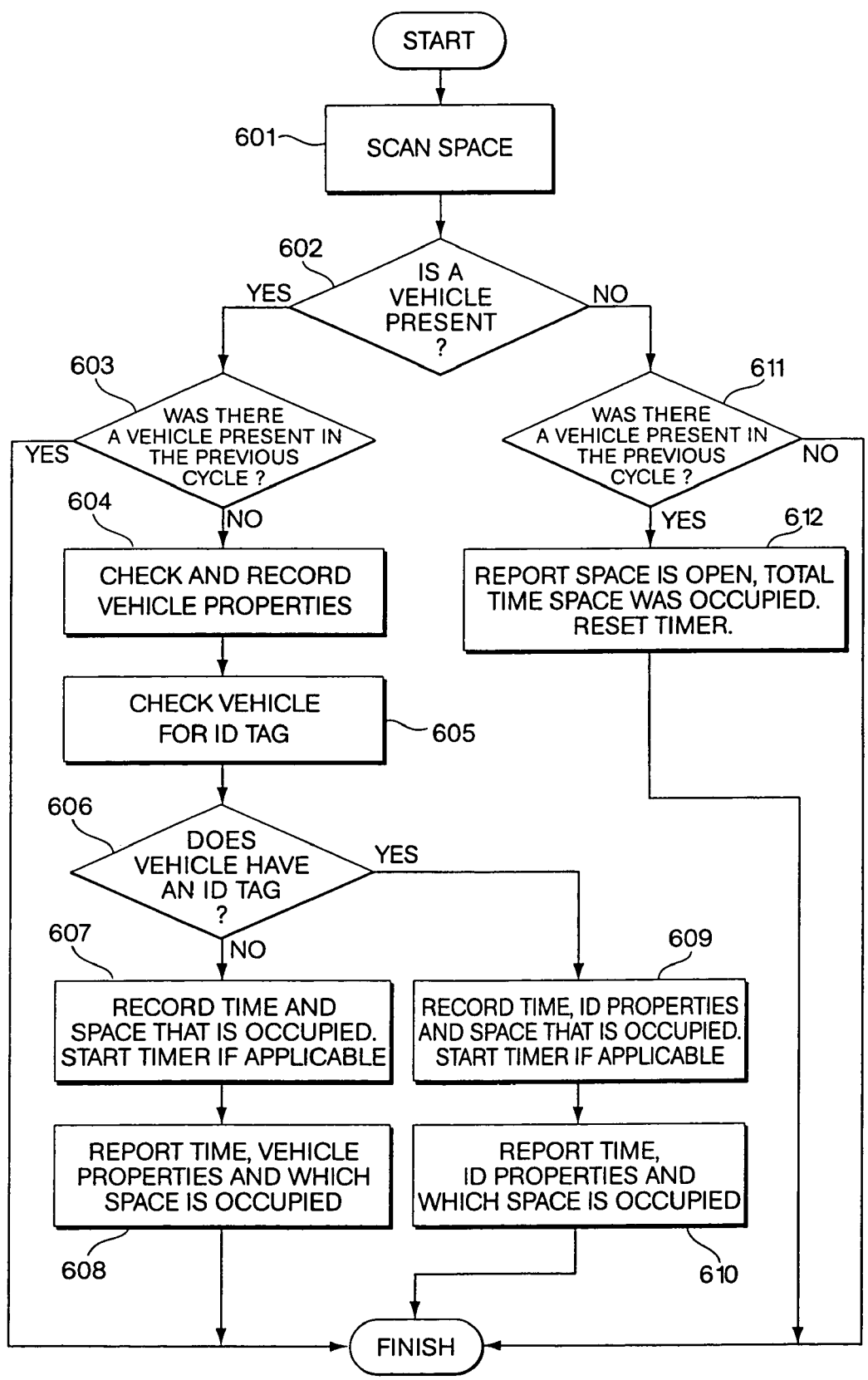
FIG. 6 is a flow diagram of a process for determining if a vehicle is in the scanning area of the wireless sensor.

FIG. 6 is a flow diagram of a process for determining if a vehicle is in the scanning area of the wireless sensor. In step 601, the sensor electronically scans the space, then continues to step 602. In step 602, if there is a vehicle in the scanning area the process continues to step 603, otherwise proceeding to step 611. In step 603 the system determines if the vehicle was present in the previous scanning cycle. If the vehicle was formerly present, then the process ends that scanning cycle, otherwise continuing to step 604. In step 604 the sensor electronically checks and records the vehicle's properties, then continues to step 605.

In step 605 the process may check for an ID tag on the vehicle, then continue to step 606. In step 606 if the vehicle does not have an ID tag the process continues to step 607, otherwise continuing to step 609. In step 607 the system starts a timer (if applicable to the scanning area configuration), records the time and space that is occupied for further processing should that be necessary, then continues to step 608. In step 608 the time when the space became occupied and a location of the space is transmitted to the central server. In step 609 the time the space was occupied, the ID properties of the car, and the space location is recorded and the timer is started, after which the process may continue to step 610. In step 610 the properties, which were recorded earlier, are reported back to the central server. In step 611 it may be determined if the vehicle was present in the previous scanning cycle. If the vehicle was not present in the previous cycle the system ends that scanning cycle, otherwise continuing to step 612, where the sensor(s) report that the space is open and the total time the space was occupied. The timer for the space may also be is reset.

Figure 7:
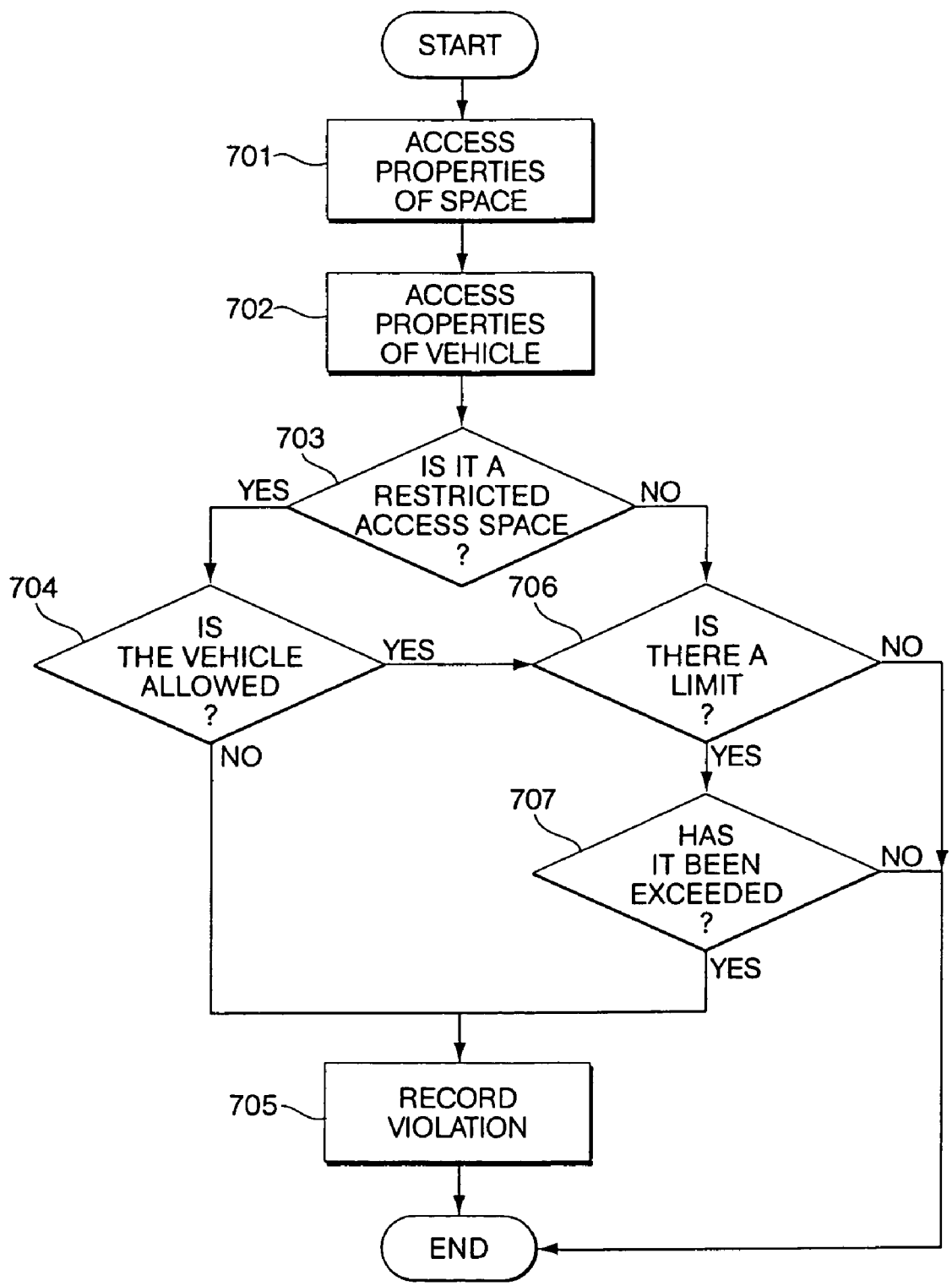
FIG. 7 is a flow diagram of a process for remote violation monitoring using wireless sensors.

FIG. 7 is a flow diagram of a process for remote violation monitoring using wireless sensors. In step 701 the central server checks the properties of the space, then continues to step 702. In step 702 the central server check the properties and ID of the vehicle, then continues to step 703. In step 703, the process determines from the properties of the space if the space is restricted. If the space restricted the central server continues to step 704, if not it continues to step 706. In step 704, the central server uses the vehicle properties and ID to determine if the vehicle is allowed in the space. If the vehicle is allowed the system continues to step 706, if not then the system continues to step 705. In step 705 the system records the violation. In step 706 the system determines from the properties of the space if there is a time limit for the space. If there is a time limit the system continues to step 707. In step 707 the system determines from the properties and ID of the vehicle and the properties of the space if the time limit has been exceeded. If the time limit has been exceeded the system continues to step 705.

Figure 8:
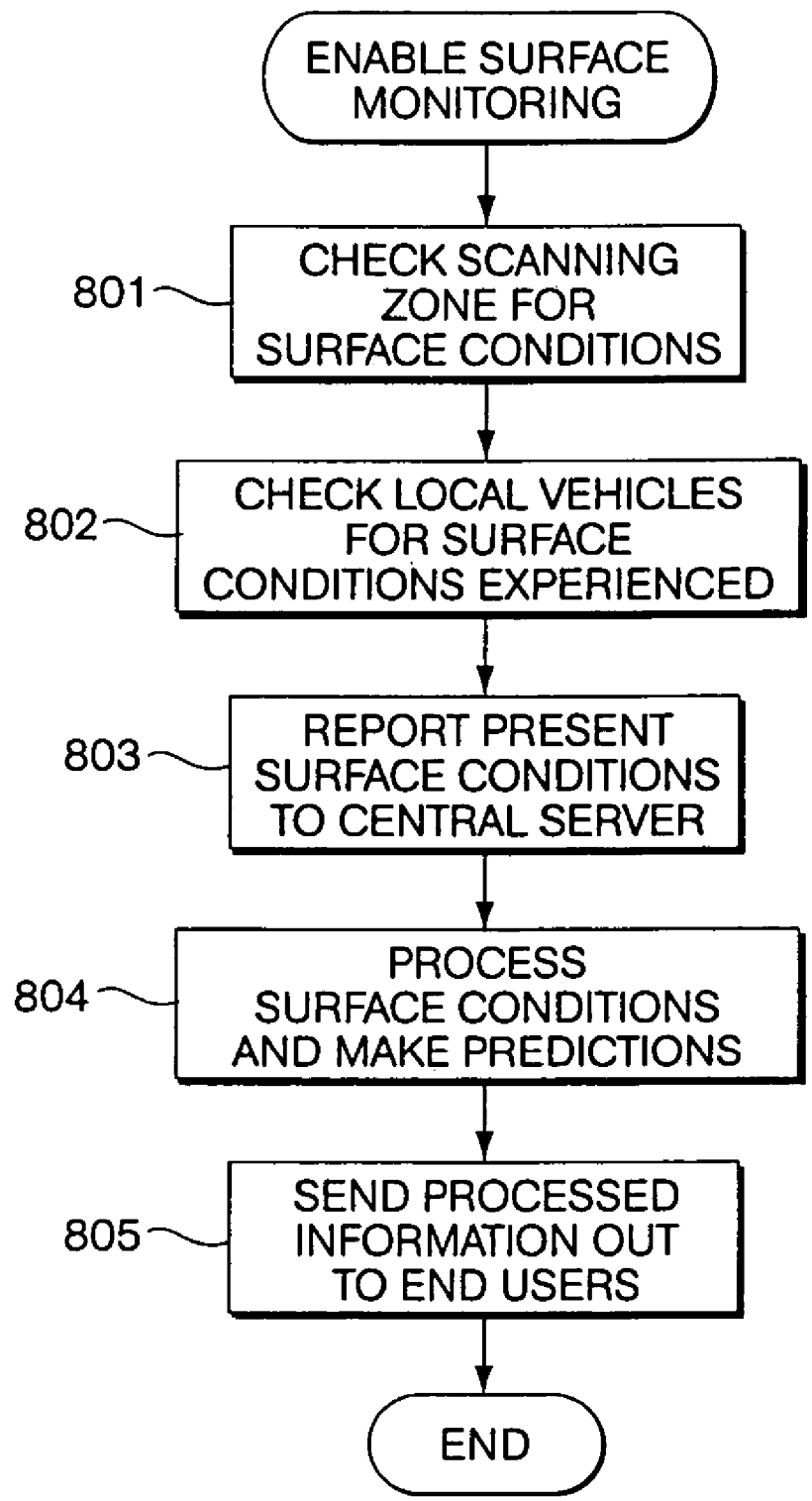
FIG. 8 is a flow diagram of a process for remote monitoring of surface conditions of a scanning area.

FIG. 8 is a flow diagram of a process for remote monitoring of surface conditions of scanning area. This process uses the wireless sensor network for the monitoring of surface area. To enable the monitoring of surface conditions the server system needs to have information on the service area. This information includes but is not limited to type of substance(s) on surface (e.g. snow, ice, water, sleet), chemical composition of substance, surface temperature, sub-surface temperature, number of freeze thaw cycles in a given period of time, and coefficient of friction of the roadway surface. By monitoring the road surface, routine maintenance such as sanding, salting, and plowing may be automatically scheduled. In step, 801 the sensor checks the scanning zone for the current surface conditions, then continues to step 802. In step 802 the sensor polls any vehicles in the scanning area for the surface conditions they have experienced, then continues to step 803. In step 803 the sensor network reports surface conditions to a central server, then continues to step 804. In step 804 the central server processes the surface condition data received from the sensor network, then continues to step 805. In step 805 the central server sends processed information electronically to end-users.

Figure 9:
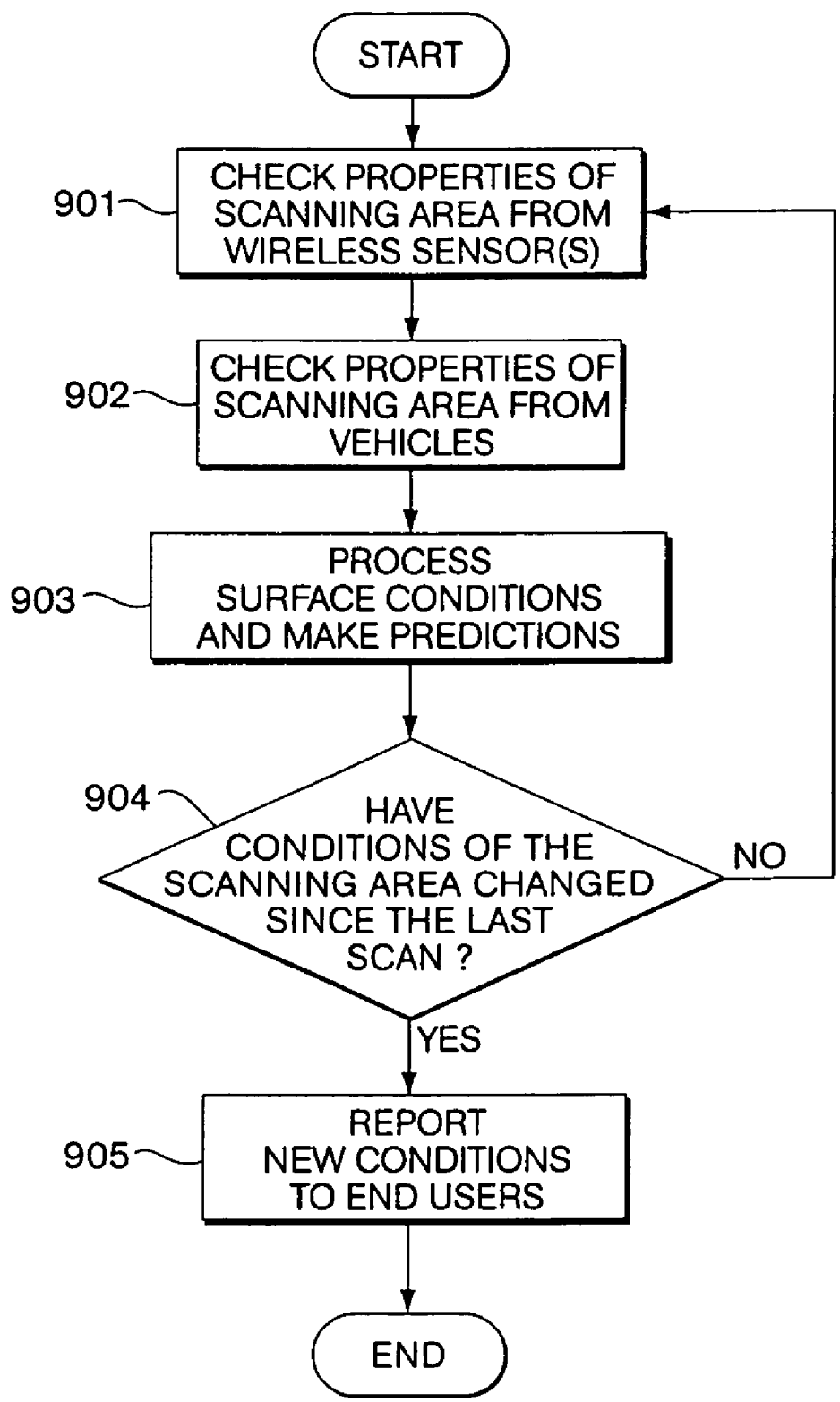
FIG. 9 is a flow diagram of a process for surface monitoring using a wireless sensor network.

FIG. 9 is a flow diagram of a process for surface monitoring using a wireless sensor network. The server system may obtain information from wireless sensors and vehicles traveling along the roadway, if available. In step 901, the server system examines the properties of the surface of the scanning area from the wireless sensors then continues to step 902. In step 902 the server system examines the properties of the scanning area from the applicable vehicles traveling along the scanning area, then continues to step 903. In step 903 the information retrieved in steps 901 and 902 is processed and predictions on future conditions are made based upon current data, historical data, and applicable algorithms, then the system continues to step 904. In step 904 the system compares the current conditions and predictions to the ones it made in previous cycles. If the results are different from previously transmitted information, i.e., there is a change in conditions, the system continues to step 905, otherwise returning to step 901. In step 905, the system electronically reports the new condition to end-users.

Figure 10:
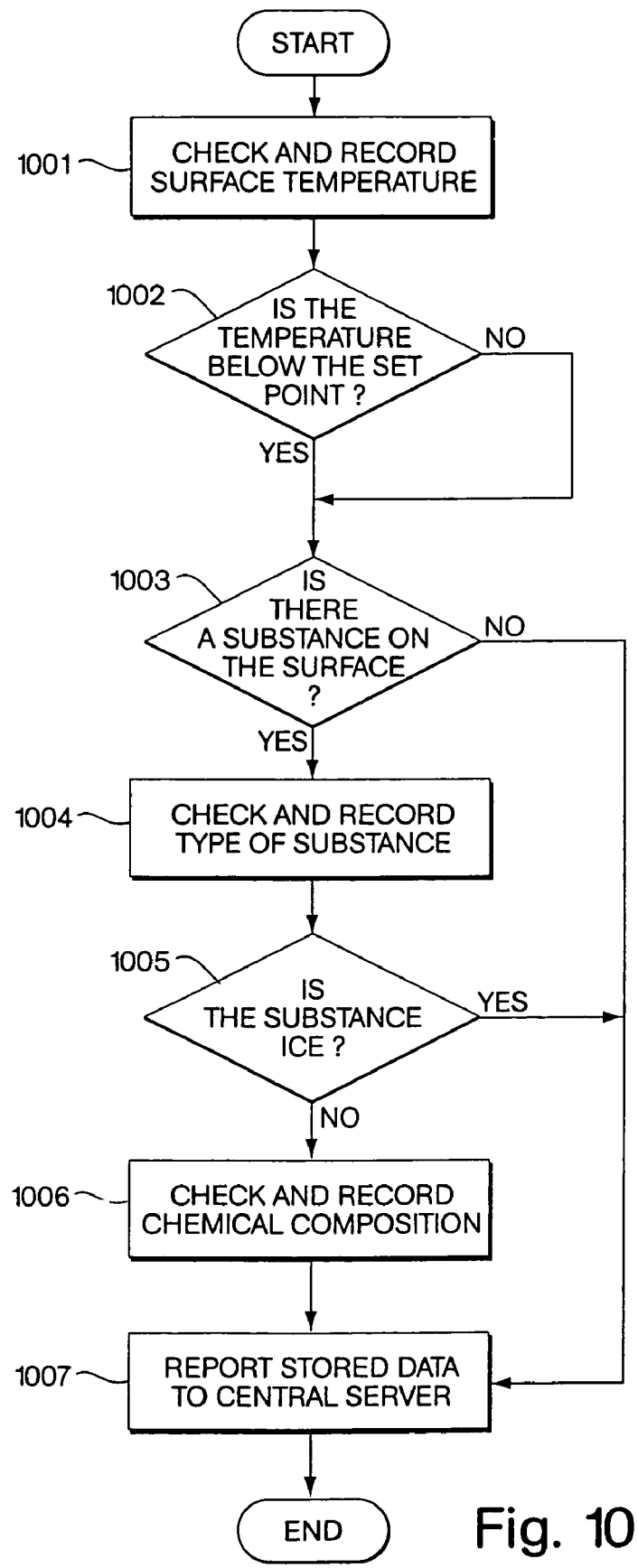
FIG. 10 is a flow diagram of a process for determining surface conditions of a scanning area.

FIG. 10 is a flow diagram of a process for determining surface conditions of a scanning area. In step 1001 the wireless sensor checks and records the surface temperature then continues to step 1002. In step 1002 the sensor determines if the surface temperature is below a point that had been previously set. If the temperature is below that set point the system continues to step 1003. In step 1003 the system determines if there is a substance on the surface. If there is a substance, then the system continues to step 1004, otherwise proceeding to step 1007. In step 1004 the system checks and records the type of substance, then continues to step 1005. In step 1005, the sensor determines if the substance is ice. If ice is not present then the system continues to step 1006, otherwise proceeding to step 1007. In step 1006 the sensor checks and records the chemical composition of the substance on the surface, then continues to step 1007. In step 1007 the system reports the stored data to the central server.

Figure 11:
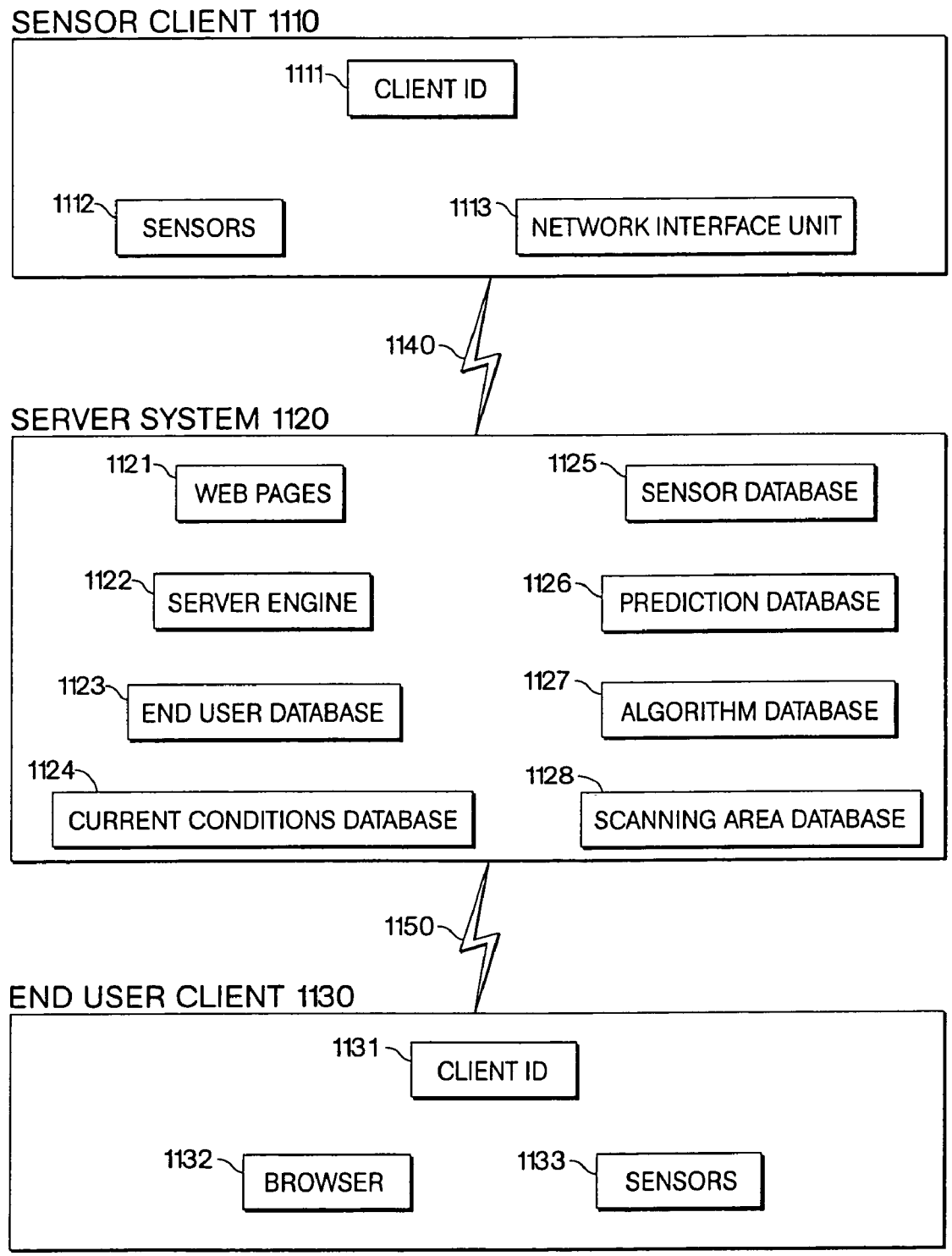
FIG. 11 is a functional block diagram of an embodiment of a wireless parking enforcement system.

FIG. 11 is a functional block diagram illustrating an embodiment of the present invention. This embodiment supports the surface monitoring, roadway segment monitoring, parking monitoring, parking reservation, parking enforcement, and other systems described herein. The server system 1120 includes various web pages 1121, a server engine 1122, an end user database 1123, a current conditions database 1124, a sensor database 1125, a prediction database 1126, an algorithm database 1127, and a scanning area database 1128. The server engine 1122 receives HTTP requests to access Web pages identified by URLs and provides the Web pages to the various end users systems. It will be appreciated that the Web pages 1121 may include static hypertext markup language content, as well as dynamically generated content using templates, databases, client information, and any other data to generate a Web page in response to a specific client request. It will further be appreciated that the Web pages may include any content, including content text, sound, graphics, motion video, and any other media or functionality, including processing logic supported by scripting languages such as JavaScript, and any other audio, visual, or functional components supported by the client's browser. An HTTP request to the server system 1120 may indicate, 1 for example, that the client 1130 would like information on roadways segments, parking spaces, parking reservation, and/or no parking zone (including but not limited to surface conditions, vehicle information and location, parking conditions, and traffic properties). The end user database 1123 contains end user information relevant for access levels as well as information requested. The end user information may include request-specific information such as the name of the end user, vehicle information, location information, allowed access level, and payment information. The current condition database 1124 contains information on the current surface conditions of all scanning areas. The sensor database 1125 contains information related to the sensor network, including but not limited to location, operational status, and operational data. The prediction database 1126 contains the prediction information on the state of the roadways segments, parking spaces, and no-parking zones (including but not limited to surface conditions, vehicle information and location, parking conditions, and traffic properties). The algorithm database 1127 contains the algorithms necessary for the system to analyze the information obtained from the wireless sensors. The scanning area database 1128 contains information on the status of the scanning areas. This information may include a number and a percentage of spaces occupied, a number of current violations, an average time spent in parking spaces, conditions of surfaces, traffic flow, traffic volume, and other data that can be obtained from the sensor network.

The sensor client system 1110 contains a client identifier 1111, sensors 1112, and a network interface unit 1113. The client identifier may be stored in a file, or other volatile or non-volatile memory of the sensor client system 1110. In one embodiment, the server system 1120 receives data from the sensor client 1110 by either polling or the sensor returns data at set intervals. The server and client systems interact by exchanging information via communications link 1140, which may include transmission over the Internet, or through a dedicated wireless network, and may include a wireless base station for communicating with a plurality of sensor clients 1110 on one hand, and the server system 1120 on the other hand. The end user client system 1130 may contain a client identifier 1131, sensors 1133, and a browser 1132. The client identifier 1131 may be stored in a file on the client device, such as an Internet browser cookie. In one embodiment, the server system 1120 assigns and sends the client identifier 1131 to the client system 1130 once when the client system 1130 first interacts with the server system 1120. The client system 1130 may subsequently includes its client identifier 1131 with messages sent to the server system 1120 so that the server system 1120 can identify the source of the message. The server system 1120 and the end user client system 1130 interact by exchange information via a communications link 1150, which may include transmission over the Internet, wireless networks, or some combination of networks.

One skilled in the art will appreciate that the remote monitoring techniques described herein may be deployed in various network environments other than the Internet. For example, remote monitoring can also be implemented through an electronic mail communication protocol in which a user requests information on a particular area, and receives a reply, in an electronic mail message. Also, various communication channels may be used such as a local area network, a wide area network, or a point-to-point dial-up connection. Also, the server system 1120 may include any combination of hardware or software that can remotely monitor scanning areas. The client system 1130 may include any combination of hardware or software that can interact with the server system 1120. This may include, for example, television-based systems or various other consumer products through which scanning areas may be remotely monitored.

Figure 12:
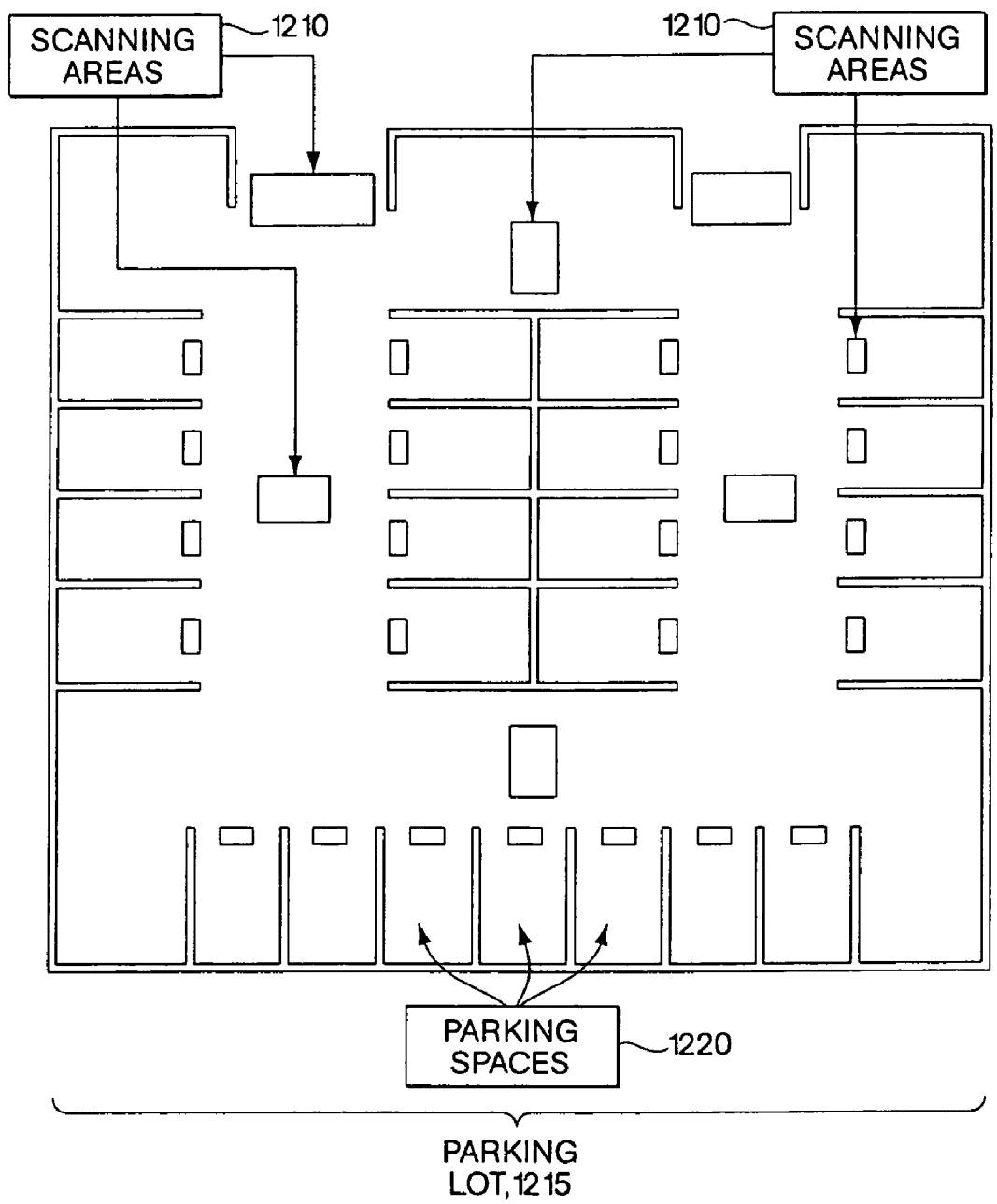
FIG. 12 is a diagram illustrating a parking monitoring system in one embodiment of the invention.

FIG. 12 is a diagram illustrating a parking monitoring system in one embodiment of the invention. FIG. 12 illustrates generally how scanning areas 1210 could be arranged throughout a parking lot 1215 to provide coverage for a system which provided information on the number and percentage of spaces occupied, number of current violations, average time spent in parking spaces 1220, condition of surfaces, and location of particular vehicles.

Figure 13:
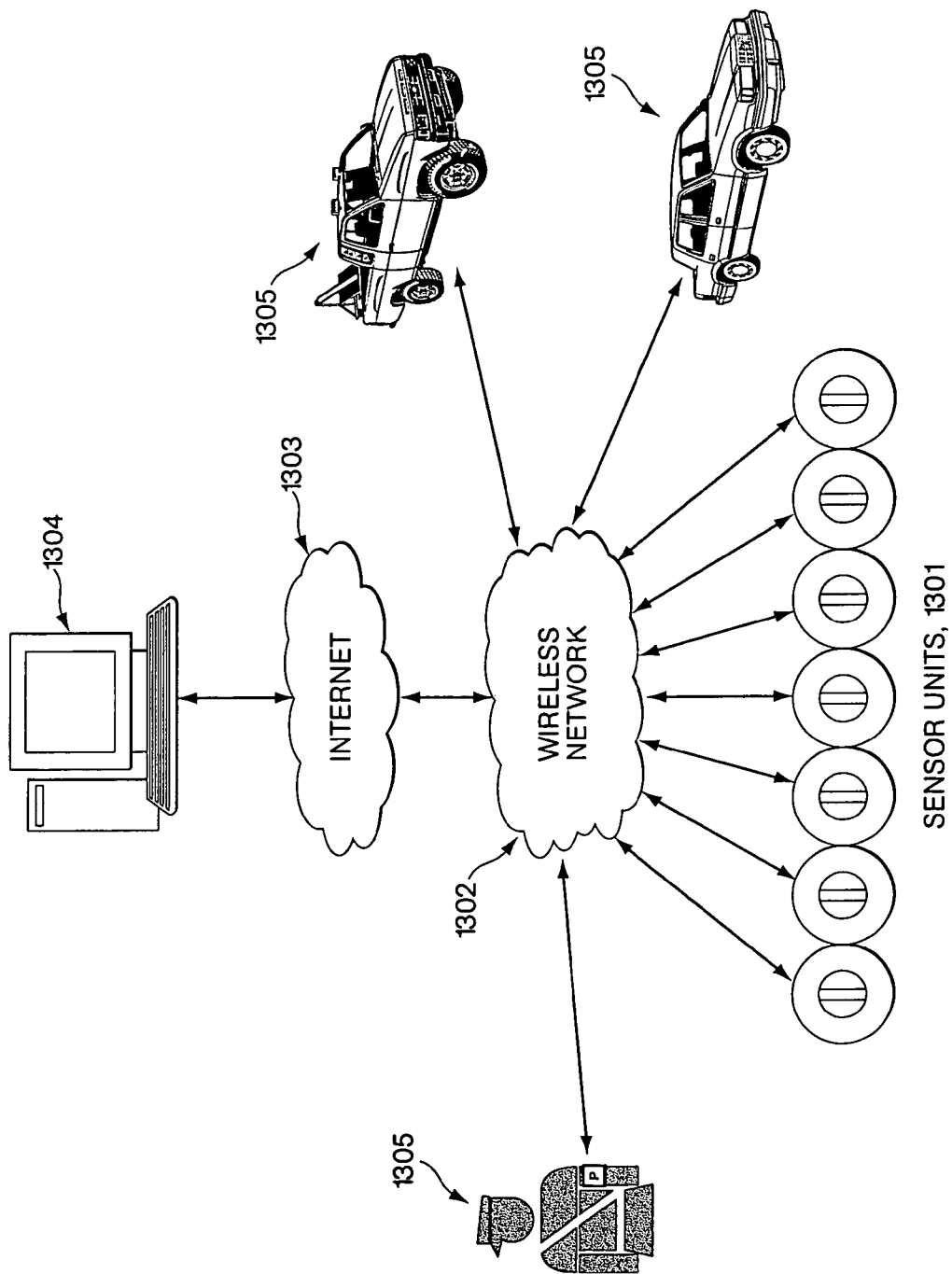
FIG. 13 shows the participants in an embodiment of the systems described herein.

FIG. 13 shows the participants in an embodiment of the systems described herein. The system may include wireless sensors 1301 in a communicating relationship with a wireless network 1302, the Internet 1303, a central computer 1304, and one or more interested parties 1305. Each of the wireless sensors 1301 may detect the presence of vehicles. The sensors 1301 communicate through the wireless network 1302, which may include, for example, one or more wireless base stations for maintaining a communicating relationship with the sensor units 1301. The central computer 1304 may communicate with the wireless network 1302 through the Internet 1303, or any other suitable public or private network. It will also be appreciated that in certain embodiments, one or more sensor units 1301 may be directly wired to the central computer 1304, or otherwise maintain communication with the central computer 1304 without the use of wireless technology.

The central computer 1304 may control data processing and storage in the system. The central computer may also relays processed information to interested parties 1305, which may include, for example, enforcement officials, parking consumers (otherwise referred to herein as 'payers'), private companies such as towing services, parking planners, and so forth.

Figure 14:
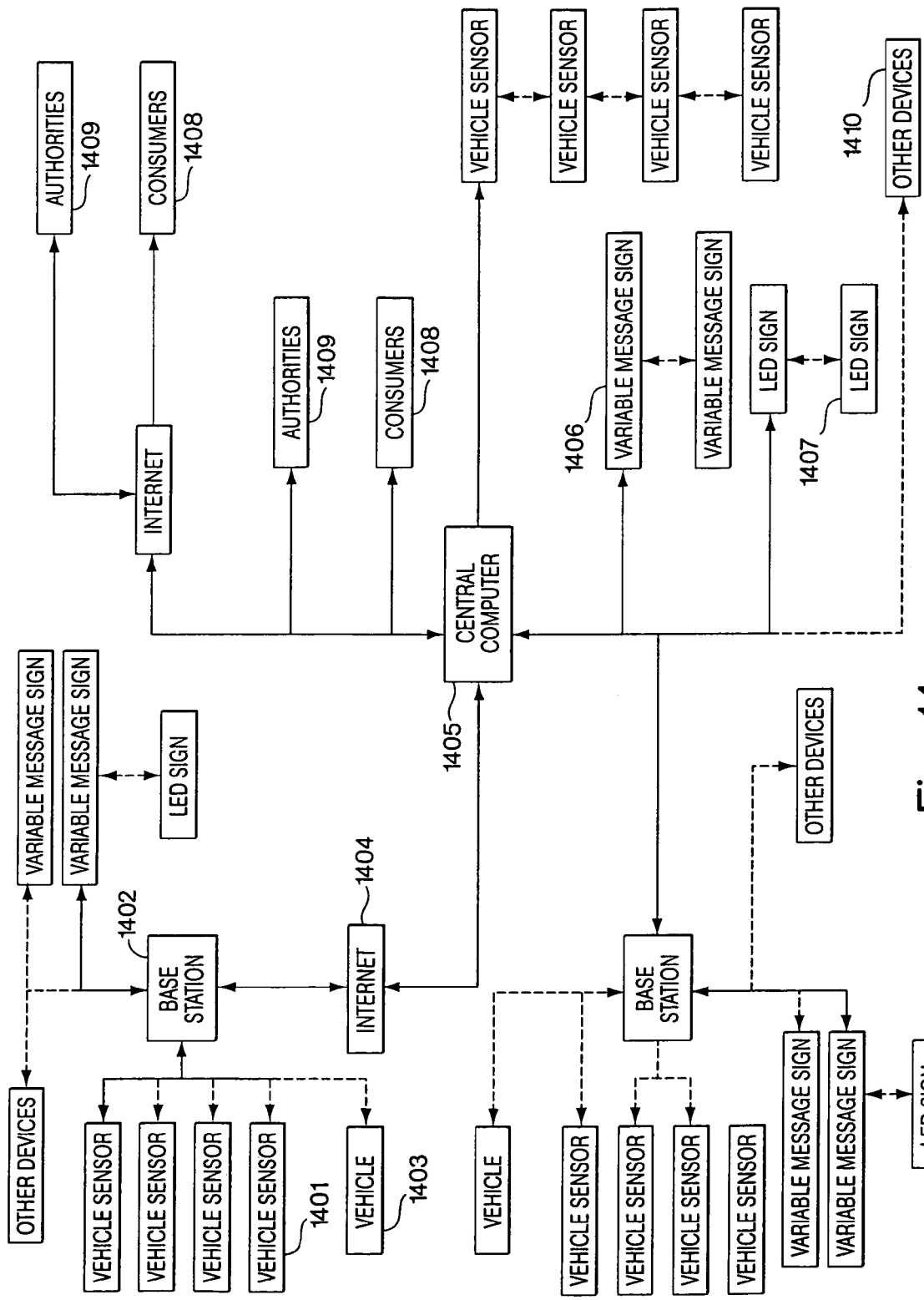
FIG. 14 is a diagram illustrating how individual sections of the parking information system interact with the central server.

FIG. 14 is a diagram illustrating how individual sections of the parking information system interact with the central server. In one embodiment, the vehicle sensors 1401 communicate wirelessly with base stations 1402. More than one vehicle sensor 1401 may communicate with any given base station 1402. Additionally, vehicle sensors 1401 may communicate to more than one base station 1402, and vehicle sensors 1401 may communicate with each other. Vehicle sensors 1401 may communicate with the central server 1405 in other ways including communicating directly with the central server 1405 either wirelessly or through some wired connection. Vehicles 1403 in areas where the system is deployed may also communicate with the central computer 1405 through a wireless link, either directly or through the base stations 1402. The base stations 1402 may relay information from the vehicle sensors 1401, vehicles 1403, and/or other devices 1410 to the central computer 1405 through a communication channel. The base stations 1402 may also processes information sent from the vehicle sensors 1401. Base stations 1402 may also communicate with each other for a variety of reason, including relay to the central computer, and distributed computing. Other devices 1410, such as weight-in-motion devices, video surveillance equipment, or license plate reading equipment, or payment devices or methods, such as cell phones, credit card payment systems, and other payment system, may also communicate to the base stations 1402 and relay data to the central computer 1405. The other devices 1410 may also directly communicate with the central computer 1405.

The central computer 1405 is responsible for the collection, processing, and dissemination of the parking information. Terms such as 'host', 'server', and 'central computer' are used herein interchangeably to describe a processing system for receiving, processing, and transmitting data, and managing communications among different entities and devices of the parking system described herein. It will be appreciated that in certain embodiments, the host may reside in a common housing with the sensor, or the parking meter, or both. It will further be appreciated that in certain embodiments, the host and the parking meter may operate in a paystation system where a centrally located station receives payments and monitors time alloted to spaces, while a wireless network of sensors monitors each space for the presence of vehicles.

The parking information system also includes various subsystems to disseminate the processed parking information. This may include, for example, variable message signs 1406, LED displays 1407, audio systems, Web pages, and telephone messaging systems. As indicated in FIG. 14, these devices may be connected directly or indirectly to the central computer 1405. The variable message signs 1406 and LED displays 1407 may receive instructions to display information from the central computer 1405; however, they may also receive commands from the base/relay stations 1402 or from the vehicle sensors 1401. The variable message signs 1406 and the LED displays 1407 may be connected to the other devices 1410 through a communications link. The information processed by the central computer 1405 may also be sent directly to end users such as consumers 1408, and/or authorities 1409. The communications link to the end users may be direct or indirect. In one embodiment the communication link is wireless and may include use of the internet 1404. Also, various communication channels may be used such as cellular, local area network, wide area network, point-to-point dial up connection or a direct data line between connected devices. Each of these various communications links and topologies are illustrated in FIG. 14.

Figure 15:
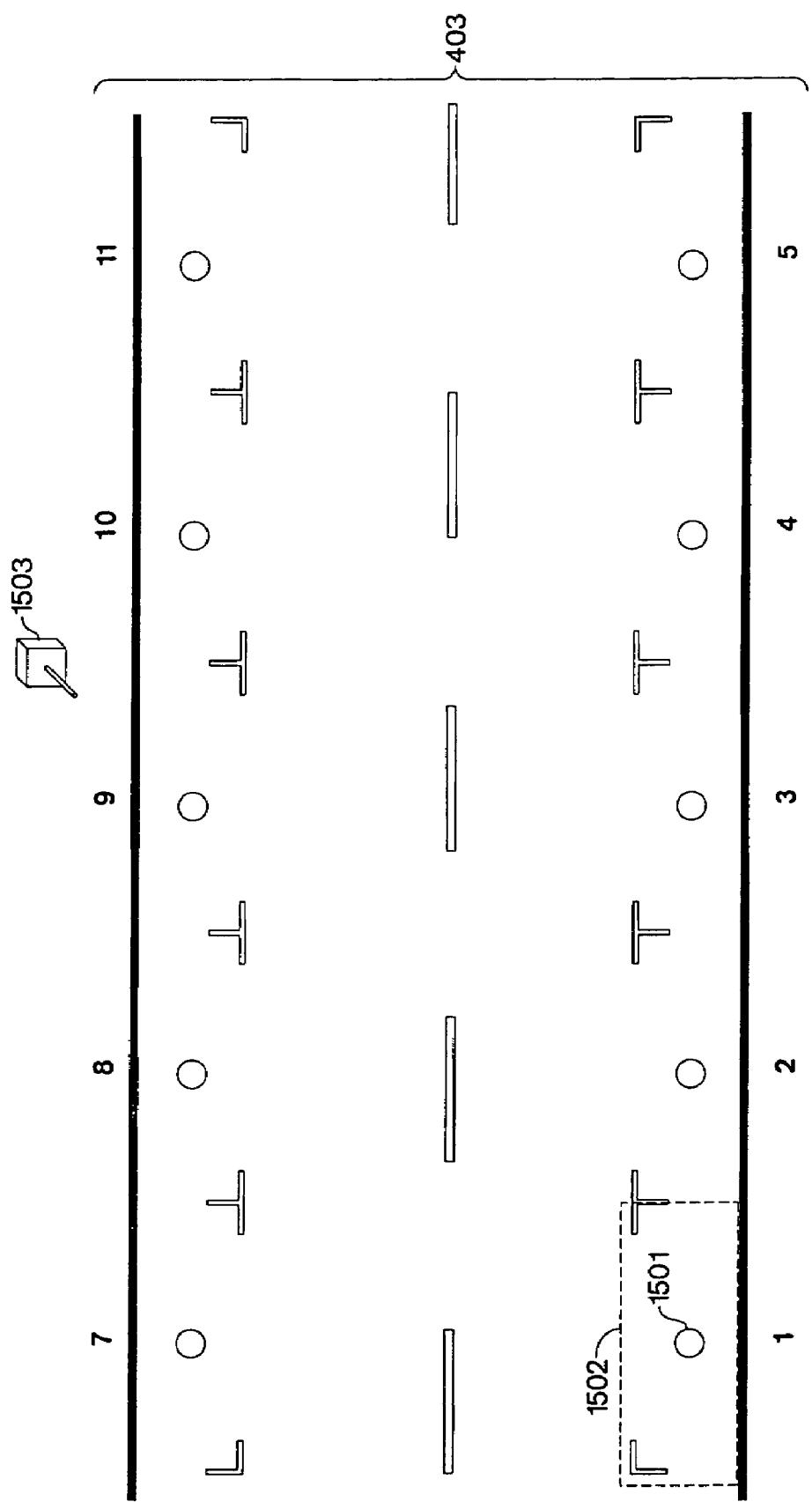
FIG. 15 depicts an on-street embodiment of the system.

FIG. 15 depicts an on-street embodiment of the system. The system of FIG. 15 may include a wireless vehicle sensor 1501 placed in each space 1502 to be monitored. The sensor 1501 may be positioned according to whether the sensor 1501 monitors a single space 1502 of a number of spaces 1502. A base station 1503 may collect data from the vehicle sensor 1501. The base station 1503 may locally process sensor data, or the base station 1503 may forward unprocessed sensor data to a central computer for processing. The sensors 1501, base station 1503, and central computer (not shown) may communicate through any of the communication channels illustrated in FIG. 14. The base station 1503 may also be connected through a communications link to a parking meter, a paystation monitoring a number of parking station, or any other parking metering and/or payment device, such as a Pay and Display machine. As described above, parking meter data may be combined with sensor data 1501 to determine, either locally or at the central computer, when a vehicle is present in a parking space 1502 in violation of one or more parking restrictions.

Figure 16:
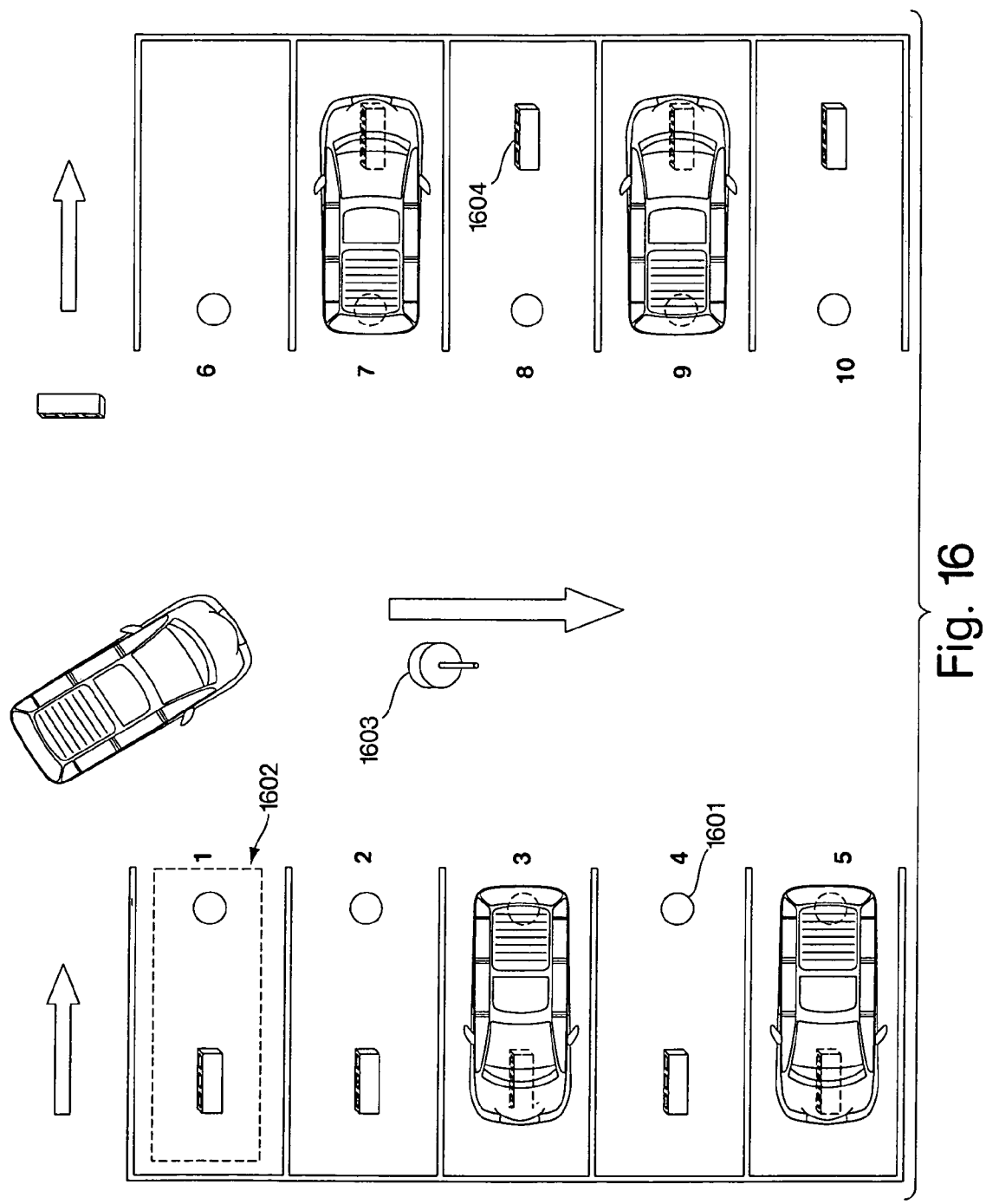
FIG. 16 depicts an off-street embodiment of the system.

FIG. 16 depicts an off-street embodiment of the system. The system may include one or more wireless vehicle sensors 1601 positioned to monitor the presence of vehicles in one or more parking spaces 1602. As noted above, a sensor 1601 may monitor more than one parking space 1602, and as further noted above, the sensors 1601 may obtain additional information beyond presence of vehicles. A base station 1603 collects data from the vehicle sensors 1601. The base station 1603 may locally process sensor data, or the base station 1603 may transmit unprocessed data to a central computer (not shown) for processing, or the system may employ a combination of local processing and central computer processing. A display unit 1604, which may be, for example, an LED display or any of the other display devices noted above, may be connected in a communicating relationship with the base station 1603, and may receive text or other data from the central computer for display. This may include, for example, a visual indication of the availability of parking spaces. The vehicle sensors 1601, base station 1603, display unit 1604, and central computer may communicate through any of the communications networks described above in reference to FIG. 14.

In one embodiment, the parking area may be displayed on a map, such as to a driver of a vehicle entering a garage. The map may show a location of the driver, and the map may display one or more available spaces, depending on where vehicles are detected by sensors placed throughout the garage.

Figure 17:
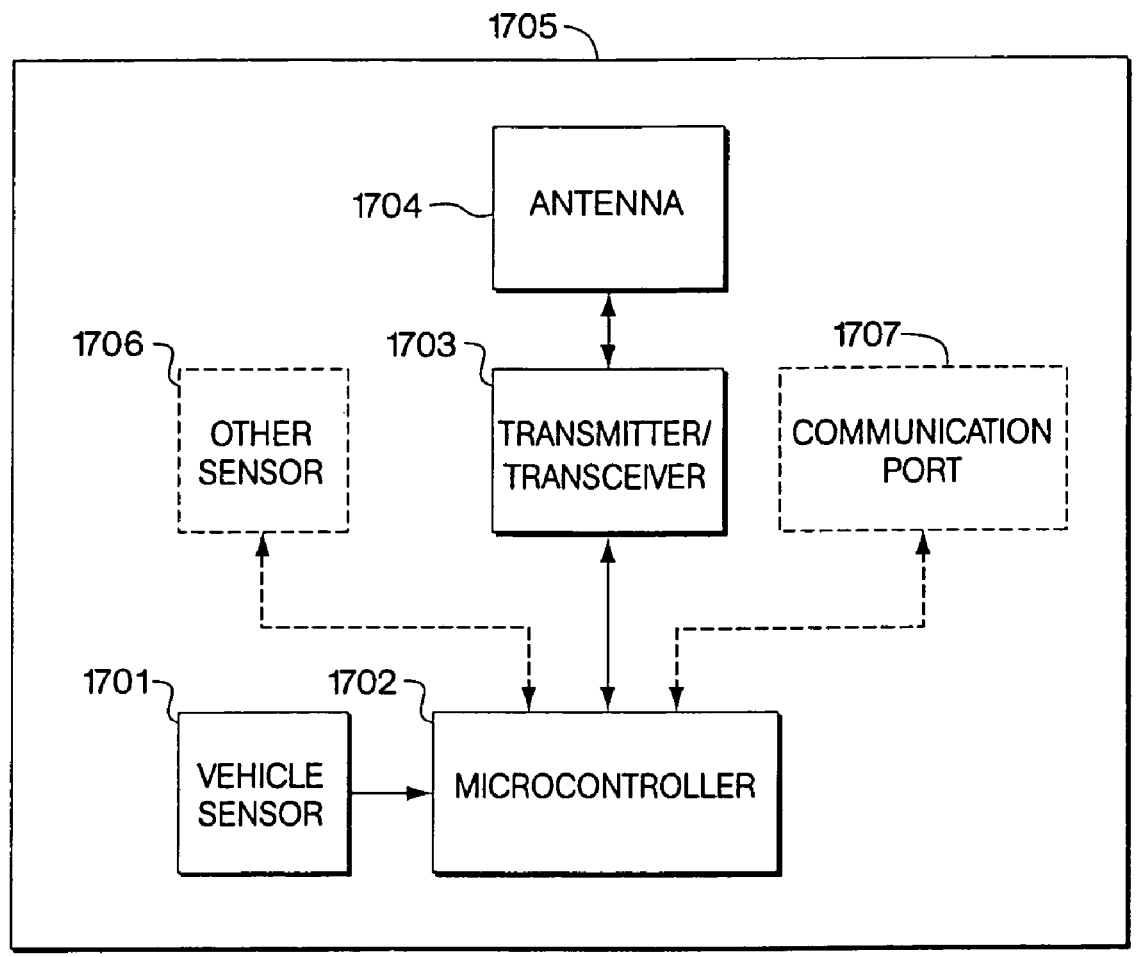
FIG. 17 is a block diagram of a wireless vehicle detector that may be used with the systems described herein.

FIG. 17 is a block diagram of a wireless vehicle detector that may be used with the systems described herein. The detector 1705 may include a vehicle sensor 1701, a microcontroller 1702, a wireless transceiver 1703, an antenna 1704, one or more other sensors 1706 and a communication port 1707.

The vehicle sensor 1701 is coupled to the microcontroller 1702 which is in turn coupled to the transmitter 1703. Generally, the microcontroller 1702 processes raw data from the sensor 1701, including low-level processing such as sampling, filtering, and the like. The microcontroller 1702 may also analyze data from the sensor 1701 to derive, for example, a presence or absence signal. The transmitter 1703 receives processed data from the microcontroller 1702 and transforms the data into a form suitable for wireless communication via the antenna 1704, and broadcasts the transformed information through wireless transmissions. The sensor information is typically available as baseband electrical signals, such as voltage or current levels, or sequences of binary digits, or bits, of information. The vehicle detector 1705 may include a plurality of vehicle sensors 1701 to provide greater accuracy or signal resolution.

The vehicle detector 1705 may optionally include one or more other sensors 1706. This may include, for example, temperature sensors, precipitation sensors, and chemical analysis sensors used to determine road surface conditions. Other sensors 1706 may also include, for example, a payment subsystem where the vehicle detector 1705 is integrated into a parking meter, or a wireless subsystem for communicating with a vehicle transponder where a vehicle identifier is used for automated payment systems.

A communications port 1707 may be included to provide another communications channel. The microcontroller 1702 may be coupled to the communications port 1707. In one embodiment, the communications port 1707 may be used to interact with other computers either directly or indirectly through a wired network. The network may be local area network, wide area network, point-to-point dial up connection or a direct data line between connected devices, and may include any of the network topologies described above with reference to FIG. 14.

The transmitter 1703 may include a transceiver for bi-directional communication between the vehicle detector 1705 and a base station or central computer. Using two-way communications, vehicle sensor code may be uploaded to the microcontroller 1702 to update operation of the detector 1705. A two-way communication link may also be used, for example, to poll vehicle detectors 1705 to verify correct operation, or to enable ad hoc network formation so that vehicle detectors 1705 may be added to or removed from the network and automatically be recognized by the parking system. A suitably configured receiver receives wireless signals through the antenna and converts the wireless signals into electrical signals. Such a receive capability is particularly useful for performing remote diagnostics or remote repair (e.g., receiving updated system firmware). Since the receive capability represents another power dissipation source, the receive capability may be configured to operate periodically.

For example, the receiver may routinely operate only during a predetermined duration of time and according to a predetermined period (e.g., the receiver operates for five minutes each day at 12 o'clock). Occasionally, any extended periods of operation that may be required, such as during a firmware upgrade, could be negotiated during the routinely occurring operational periods.

In general, the antenna 1704 may be any transducer capable of converting electrical signals into wireless broadcast signals and vise versa. Examples of transducers include antennas such as those typically used in wireless radio frequency (RF) communications, electrical-optical converters, such as light emitting diodes, lasers, photodiodes, and acoustic devices, such as piezoelectric transducers. In one embodiment, the antenna 1704 is an electrical antenna, designed for operation in the frequency range between 800 MHz and 2,500 MHz, generally known as the ultrahigh frequency (UHF) band. The UHF frequency band is particularly well suited to the vehicle detector 1705 because UHF circuits and components are relatively small in size and consume relatively low power.

The vehicle detector 1705 may be configured for installation beneath, beside or overhead the surface to be scanned. The detector 1705 may be compact and, with battery power, fully wireless so that it may be conveniently located wherever desired. Furthermore, the detector 1705 may be configured in a single, self-contained and environmentally-sealed package. The detector 1705 may be installed completely beneath a surface such as pavement, or partially beneath a surface, with some portion of the detector 1705 exposed to the road surface. With currently available components, a detector 1705 including the transmitter 1703, the antenna 1704, the microcontroller 1702, and the vehicle sensor 1701 may be constructed with a packaged volume of less than five cubic inches. Installation of such a detector 1705 may require little or no disturbance to an existing infrastructure.

Figure 18:
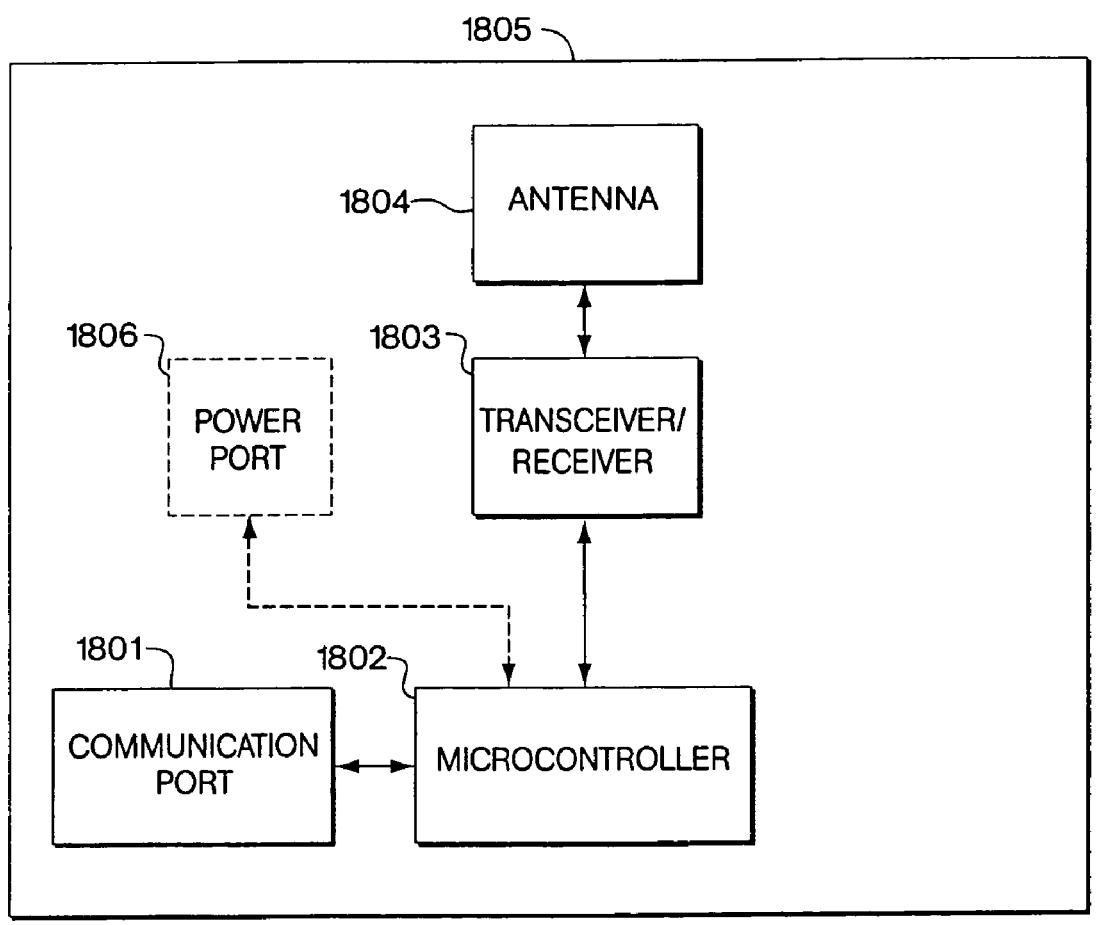
FIG. 18 is a block diagram of a base station that may be used with the systems described herein.

FIG. 18 is a block diagram of a base station that may be used with the systems described herein. The base station 1805 may include a communication port 1801, a microcontroller 1802, a transceiver 1803, an antenna 1804, and a power port 1806.

The microcontroller 1802 is in electrical communication with the transceiver 1803. Generally the transceiver 1803 transforms the wireless transmissions received from vehicle sensors into a form suitable for use by the microcontroller 1802, and transforms data from the microcontroller 1802 into a form suitable for wireless transmission. The base station 1805 may be battery powered or it may be connected to a power source through the power port 1806. In one embodiment, the transceiver 1803 may include only a receiver, such as where the base station 1805 does not transmit data to vehicle detectors. One skilled in the art will appreciate that various communication protocols and configurations can be used for the communications channel. These may include cellular, wireless local area network, or wireless wide area network. The microcontroller 1802 is in electrical communication with the communications port 1801. The communications port 1801 may be used to interact with other computers, such as a central computer, either directly or indirectly through a network. The network may include any of the network topologies or technologies described above with reference to FIG. 14.

In general, the antenna 1804 may be any transducer capable of converting wireless broadcast signals into electrical signals and vice versa. Examples of transducers include antennas, such as those typically used in wireless radio frequency (RF) communications, electrical-optical converters, such as light emitting diodes, lasers, photodiodes, and acoustic devices, such as piezoelectric transducers. In one embodiment, the antenna 1804 is an electrical antenna, designed for operation in the frequency range between 800 MHz and 2,500 MHz, generally known as the ultrahigh frequency (UHF) band.

It will be appreciated that the above systems are merely illustrative, and that other processes, or orders of steps in processes, or system features, may be usefully deployed with a system as described herein. Thus, while the invention has been disclosed in connection with the preferred embodiments shown and described in detail, various modifications and improvements thereon will become readily apparent to those skilled in the art. It should be understood that all matter contained in the above description or shown in the accompanying drawings shall be interpreted as illustrative, and not in a limiting sense, and that the following claims should be interpreted in the broadest sense allowable by law.

What is claimed is:

1. A system comprising:
   a circuit comprising:
      a sensor;
      first logical circuitry for determining the presence or change in presence of a vehicle in a parking space, the first logical circuitry in electrical communication with the sensor; and
      second logical circuitry for determining a parking violation associated with the parking space, the second logical circuitry in electrical communication with the first logical circuitry; and
   a host in wireless communication with the circuit for sending and receiving information to and from the circuit, wherein the host is configured to monitor at least one of the presence or change in presence of the vehicle in the parking space and the parking violation.

2. The system of claim 1 wherein the host determines when a payment for a parking space is about to expire and generates a notification to a payer who has paid for use of the parking space.

3. The system of claim 2 wherein the payer is notified through at least one of an electronic mail message, a telephonic message, or an electronic page.

4. The system of claim 1 wherein the parking violation is determined based on, at least in part, information received from the first logical circuitry.

5. The system of claim 4 wherein the host notifies at least one enforcement official of the violation by transmitting a message to a device used by the enforcement official.

6. The system of claim 1 wherein the host and the circuit communicate through a wireless interface.

7. The system of claim 1 wherein the host employs a wireless payment process.

8. The system of claim 1 further comprising a plurality of sensors arranged to monitor parking in a parking area, the parking area being at least one of a parking garage, a parking lot, or a public street.

9. A method comprising:
   receiving over a wireless connection a first signal and a second signal originating from a circuit comprising:
      a sensor,
      first logical circuitry for determining the presence or change in presence of a vehicle in a parking space, the first logical circuitry in electrical communication with the sensor and generates the first signal, and second logical circuitry for determining a parking violation associated with the parking space, the second logical circuitry in electrical communication with the first logical circuitry and generates the second signal; and based on the first and second signals, monitoring at least one of the presence or change in presence of the vehicle in the parking space and the parking violation.

10. The method of claim 9 further comprising generating a message to an enforcement official, in response to the parking violation, notifying the enforcement official of the parking violation and a location of the parking space in which the parking violation has occurred.

11. The method of claim 9 further comprising determining when a payment for a parking space is about to expire and generating a notification to a payer who has paid for use of the parking space.

12. The method of claim 9 wherein generating a message to an enforcement official includes transmitting the message to a wireless device used by the enforcement official.

13. The system of claim 9 wherein the enforcement official is a private towing company.

14. The system of claim 9 wherein the host is a paystation that manages payments for a plurality of parking spaces.

15. The system of claim 9 wherein the host receives payments through a wireless payment process.

* * * * *